(12) United States Patent
Mochizuki et al.

(10) Patent No.: US 9,510,247 B2
(45) Date of Patent: Nov. 29, 2016

(54) MOBILE COMMUNICATION SYSTEM, GATEWAY DEVICE, BASE STATION, COMMUNICATION METHOD, AND PROGRAM

(75) Inventors: Koichi Mochizuki, Tokyo (JP); Masahide Mochizuki, legal representative, Saitama (JP); Sumiko Mochizuki, legal representative, Saitama (JP); Yoshio Ueda, Tokyo (JP)

(73) Assignee: NEC Corporation, Tokyo (JP)

( * ) Notice: Subject to any disclaimer, the term of this patent is extended or adjusted under 35 U.S.C. 154(b) by 815 days.

(21) Appl. No.: 13/503,814

(22) PCT Filed: Oct. 25, 2010

(86) PCT No.: PCT/JP2010/068823
§ 371 (c)(1),
(2), (4) Date: Jun. 27, 2012

(87) PCT Pub. No.: WO2011/052527
PCT Pub. Date: May 5, 2011

(65) Prior Publication Data
US 2012/0263111 A1 Oct. 18, 2012

(30) Foreign Application Priority Data
Oct. 26, 2009 (JP) .................................. 2009-245678

(51) Int. Cl.
*H04W 36/00* (2009.01)
*H04W 36/08* (2009.01)
(Continued)

(52) U.S. Cl.
CPC ......... *H04W 36/0055* (2013.01); *H04W 36/08* (2013.01); *H04W 88/08* (2013.01); *H04W 88/16* (2013.01)

(58) Field of Classification Search
None
See application file for complete search history.

(56) References Cited

U.S. PATENT DOCUMENTS

2009/0047960 A1* 2/2009 Gunnarsson ......... H04J 11/0093
455/436
2009/0305699 A1* 12/2009 Deshpande et al. .......... 455/434
(Continued)

FOREIGN PATENT DOCUMENTS

JP 9-84107 A 3/1997
JP 2007-116697 A 5/2007
(Continued)

OTHER PUBLICATIONS

3GPP TR 23.830 V0.6.0, $3^{rd}$ Generation Partnership Project; Technical Specification Group Services and System Aspects; Architecture Aspects of Home NodeB and Home eNodeB, Sep. 2009, pp. 38-42, 45, Release 9.
(Continued)

*Primary Examiner* — Chirag Shah
*Assistant Examiner* — Srinivasa Reddivalam
(74) *Attorney, Agent, or Firm* — Foley & Lardner LLP

(57) ABSTRACT

A mobile communication system comprises: at least one terminal; a source base station to which the terminal is connected before movement of the terminal; a target base station to which the terminal is connected after the movement; a gateway device that connects the source base station and the target base station to a core network; and a core network node provided in the core network, wherein: the gateway device determines by itself, or makes query to the core network node to determine whether or not to preferentially treat the terminal by the target base station when the terminal moves from the source base station to the target base station; and the gateway device notifies to the target base station preferential information indicative of whether or not to preferentially treat the terminal by the target base station.

15 Claims, 29 Drawing Sheets

(51) Int. Cl.
*H04W 88/08* (2009.01)
*H04W 88/16* (2009.01)

(56) References Cited

U.S. PATENT DOCUMENTS

| | | | |
|---|---|---|---|
| 2010/0041405 A1* | 2/2010 | Gallagher et al. | 455/436 |
| 2010/0165862 A1* | 7/2010 | Nylander et al. | 370/252 |
| 2010/0197277 A1* | 8/2010 | Jung | H04W 4/08 455/411 |
| 2010/0261473 A1* | 10/2010 | Al-Bakri | H04W 8/02 455/435.2 |
| 2010/0279687 A1* | 11/2010 | Horn | H04W 36/08 455/435.1 |
| 2010/0330993 A1* | 12/2010 | Kone | H04W 36/0055 455/436 |
| 2011/0105085 A1 | 5/2011 | Aoyagi | |
| 2012/0026974 A1* | 2/2012 | Fong | 370/331 |

FOREIGN PATENT DOCUMENTS

| | | |
|---|---|---|
| JP | 2009-510887 A | 3/2009 |
| WO | WO 2009/125799 A1 | 10/2009 |
| WO | WO 2010/121558 A1 | 10/2010 |

OTHER PUBLICATIONS $3^{RD}$ Generation Partnership Project; Technical Specification Group Services and System Aspects; Service Requirements for Home NodeBs and Home eNodeBs, 3GPP TS 22.220 V10.0.0, Sep. 2009, pp. 1-22.
Alcatel-Lucent. "Support of Inter-Home eNB Mobility." 3GPP TSG-RAN WG3 #65, R3-091825, Aug. 24-28, 2009 (3 pgs.).
Ericsson. "QoS control at handover to hybrid cell." 3GPP TSG-RAN WG3 #65-bis, R3-092459, Oct. 12-15, 2009 (3 pgs.).
Office Action mailed Apr. 19, 2016 in related Japanese Appl. 2015-102503 with partial English-language translation (14 pgs.).

* cited by examiner

FIG. 4A 9.1.55 UPLINK INFORMATION EXCHANGE REQUEST(3GPP TS 25.413)

| IE/Group Name | Presence | Range | IE type and reference | Semantics description | Criticality | Assigned Criticarity |
|---|---|---|---|---|---|---|
| ... | | | | | | |
| Information Exchange Type | M | | 9.2.1.72 | | YES | Reject |
| Information Transfer Type | C-Iftransfer | | 9.2.1.63 | | YES | Reject |
| Information Request Type | C-ifrequest | | 9.2.1.73 | | YES | Reject |

FIG. 4B

9.2.1.73 Information Request Type

| IE/Group Name | Presence | Range | IE type and reference | Semantics description |
|---|---|---|---|---|
| Choice Information Request Type | | | | |
| >MBMS IP Multicast Address and APN Request | | | 9.2.1.7.8 | |
| >Permanent NAS UE Identity | | | 9.2.3.1 | |
| > CSG membership Status | | | | |

FIG. 4C 9.x.x.x CSG Membership Status

| IE/Group Name | Presence | Range | IE type and reference | Semantics description |
|---|---|---|---|---|
| CSG Membership Status | | | | |
| >CSG ID | O | | | |
| >IMSI | O | | | |
| >TMSI | O | | | |
| >LAI | O | | | |
| >P-TMSI | O | | | |
| >RAI | O | | | |

FIG. 5A 9.1.56 UPLINK INFORMATION EXCHANGE RESPONSE(3GPP TS 25.413)

| IE/Group Name | Presence | Range | IE type and reference | Semantics description | Criticality | Assigned Criticality |
|---|---|---|---|---|---|---|
| ... | | | | | | |
| Information Requested | O | | 9.2.1.74 | | YES | ignore |

FIG. 5B 9.2.1.74 Information Requested

| IE/Group Name | Presence | Range | IE type and reference | Semantics description |
|---|---|---|---|---|
| Choice Information Requested | | | | |
| >Requested MBMS IP Multicast Address and APN | | | 9.2.3.46 | |
| >Requested Multicast Service List | | | 9.2.3.47 | |
| > Requested CSG membership Status | | | | |

FIG. 5C 9.x.x.x Requested CSG Membership Status

| IE/Group Name | Presence | Range | IE type and reference | Semantics description |
|---|---|---|---|---|
| Requested CSG Membership Status | | | | |
| >Requested CSG Membership Status | M | | | |

FIG. 6

9.1.10 RELOCATION REQUET(3GPP TS 25.413)

| IE/Group Name | Presence | Range | IE type and reference | Semantics description | Criticality | Assigned Criticarity |
|---|---|---|---|---|---|---|
| ... | | | | | | |
| CSG Membership Status | O | | | | | |

FIG. 7A

| HNB-S \ HNB-T | Intra-CSG | | Inter-CSG | |
|---|---|---|---|---|
| | Hybrid | Close | Hybrid | Close |
| Hybrid | ※1(allowed CSG)<br>※3(Non allowed CSG) | ※3 | ※2 | ※4 |
| Close | ※1 | ※3 | ※2 | ※4 |

FIG. 7B

| HNB-T<br>HNB-S | Hybrid | Close | Open |
|---|---|---|---|
| Hybrid | ※2 | REFER TO FIG. 7A | ※3 |
| Close | ※2 | ※4 | ※3 |
| Open | ※3 | ※3 | ※3 |

FIG. 10

9.1.4 Direct Transfer(3GPP TS 25.468)

| IE/Group Name | Presence | Range | IE type and reference | Semantics description | Criticality | Assigned Criticality |
|---|---|---|---|---|---|---|
| ... | | | | | | |
| CSG Membership Status | C-if Handover | | | This information is only used during the Intra HNB-GW(Intra CSG) relocation. In all other cases, this information is ignored. | YES | REJECT |

| Condition | explanation |
|---|---|
| If Handover | This IE shall be present if the Cause IE is set to "Handover". |

FIG. 13 x.x.x.x HNBRAP Relocation Request

| IE/Group Name | Presence | Range | IE type and reference | Semantics description |
|---|---|---|---|---|
| ... | | | | |
| CSG Membership Status | O | | | |
| CSG ID | O | | | |
| IMSI | O | | | |
| TMSI | O | | | |
| LAI | O | | | |
| P-TMSI | O | | | |
| RAI | O | | | |
| Access Mode | O | | | |

FIG. 14 x.x.x.x HNBAP Access Control Query

| IE/Group Name | Presence | Range | IE type and reference | Semantics description |
|---|---|---|---|---|
| ... | | | | |
| CSG ID | O | | | |
| IMSI | O | | | |
| TMAI | O | | | |
| LAI | O | | | |
| P-TMSI | O | | | |
| RAI | O | | | |

FIG. 15 x.x.x.x HNBAP Access Control Response

| IE/Group Name | Presence | Range | IE type and reference | Semantics description |
|---|---|---|---|---|
| ... | | | | |
| CSG Membership Status | O | | | |

FIG. 18 x.x.x.x X2AP Handover Request

| IE/Group Name | Presence | Range | IE type and reference | Semantics description |
|---|---|---|---|---|
| ... | | | | |
| GUMMEI | M | | | |
| CSG Membership Status | O | | | |
| CSG ID | O | | | |
| Access Mode | O | | | |

FIG. 19 x.x.x.x S1AP  Access Control Query

| IE/Group Name | Presence | Range | IE type and reference | Semantics description |
|---|---|---|---|---|
| ... |  |  |  |  |
| GUMMEI | M |  |  |  |
| CSG ID | O |  |  |  |

FIG. 20 x.x.x.x S1AP Access Control Response

| IE/Group Name | Presence | Range | IE type and reference | Semantics description |
|---|---|---|---|---|
| ... | | | | |
| CSG Membership Status | O | | | |

FIG. 23

9.1.5.4 S1AP Handover Request

| IE/Group Name | Presence | Range | IE type and reference | Semantics description |
|---|---|---|---|---|
| ... | | | | |
| GUMMEI | M | | | |
| CSG Membership Status | O | | | |
| CSG ID | O | | | |
| Access Mode | O | | | |

MOBILE COMMUNICATION SYSTEM, GATEWAY DEVICE, BASE STATION, COMMUNICATION METHOD, AND PROGRAM

RELATED APPLICATION

The present invention is the National Phase of PCT/JP2010/068823, filed Oct. 25, 2010, and claims the benefit of the priority of Japanese Patent Application No. 2009-245678 (filed on Oct. 26, 2009), the disclosures of which are incorporated herein in their entirety by reference.

TECHNICAL FIELD

The present invention relates to a mobile communication system, a gateway device, a base station, a communication method, and a medium.

BACKGROUND

Recently, a small base station for a home and a small office referred to as a home node B (HNB) has been under study in a 3GPP (3rd Generation Partnership Project).

An operator sets a CSG ID (Closed Subscriber Group Identity) of a closed subscriber group (Closed Subscriber Group, hereinafter abbreviated as a "CSG") in a HNB in order to limit access to the HNB. The HNB allows access only from a user equipment (UE: User Equipment such as a mobile station or a terminal) whose allowed list (allowed Closed Subscriber Group identifies subscribers list, hereinafter abbreviated as an "allowed CSG list") includes the CSG ID of the HNB, and limits access from other UEs.

The HNB includes the following (1) to (3) access modes. The UE from which the HNB allows access differs according to the access mode. The HNB can perform preferential control according to the UE which has accessed (Non-patent Document 1). As an example of the preferential control, there can be pointed out allowing preferential access (such as preferential bandwidth assignment, securement of a resource for access of the UE having the allowed CSG list including the CSG ID of the HNB even if the number of UEs which have made simultaneous accesses has increased and contention has occurred), assignment of a special charging rate, or the like, for the UE whose allowed CSG list includes the CSG ID of the HNB.

(1) Close Mode
The HNB allows access only from the UE whose allowed CSG list includes the CSG ID of the HNB.
(2) Open Mode
The HNB does not limit access
(3) Hybrid Mode
The HNB allows access from the UE whose allowed CSG list includes the CSG ID of the HNB and other usual UEs whose allowed CSG lists do not include the CSG ID of the HNB. The hybrid mode enables the HNB to perform the preferential control over the UE whose allowed CSG list includes the CSG ID of the HNB.
[Non-patent Document 1] 3GPP TS 22.220 V10.0.0

SUMMARY

The entire content of disclosure of Non-patent Document 1 listed above is incorporated herein by reference.
The following analysis has been made by the present invention. When a preferential UE moves between HNBs under control of a same HNB-GW (Home Node B Gateway) (such movement being referred to as "intra HNB-GW relocation"), it is necessary to determine whether or not to preferentially treat the UE according to setting of the CSG ID and the access mode of the HNB of the movement destination. Then, when it is determined that the UE is to be preferentially treated, it is necessary to notify the HNB of the movement destination that the UE should be preferentially treated.

However, there is a problem that no means is present for performing the notification to the HNB of the movement destination, so that the HNB of the movement destination cannot preferentially treat the UE.

Therefore, there is a need in the art to provide a mobile communication system, a gateway device, a base station, a communication method, and a medium, which make it possible. that the base station (HNB) of the movement destination (preferentially) treat the terminal (UE) as a preferential terminal.

According to a first aspect of the present invention, there is provided a mobile communication system comprising:
at least one terminal;
a source base station to which the terminal is connected before movement of the terminal;
a target base station to which the terminal is connected after the movement of the terminal;
a gateway device that connects the source base station and the target base station to a core network; and
a core network node provided in the core network, wherein:
the gateway device determines by itself, or makes query to the core network node to determine whether or not to preferentially treat the terminal by the target base station when the terminal moves from the source base station to the target base station; and
the gateway device notifies to the target base station preferential information indicative of whether or not to preferentially treat the terminal by the target base station.

According to a second aspect of the present invention, there is provided a gateway device which connects a source base station and a movement destination station to a core network, at least one terminal being connected to the source base station before movement of the terminal and being connected to the target base station after the movement of the terminal, the gateway device comprising:
a control unit that determines by itself, or makes query to a core network node in the core network to determine whether or not to preferentially treat the terminal by the target base station when the terminal moves from the source base station to the target base station; and
a first transceiver unit that notifies to the target base station preferential information indicative of whether or not to preferentially treat the terminal by the target base station.

According to a third aspect of the present invention, there is provided a base station to which at least one terminal is connected after movement of the terminal and which is connected to a core network through a gateway device, comprising:
a transceiver unit that receives from the gateway device preferential information indicative of whether or not to preferentially treat the terminal by the base station.

According to a fourth aspect of the present invention, there is provided a communication method in a mobile communication system comprising:
at least one terminal;
a source base station to which the terminal is connected before movement of the terminal;
a target base station to which the terminal is connected after the movement of the terminal;

a gateway device that connects the source base station and the target base station to a core network; and
a core network node provided in the core network, the method comprising:
by the gateway device, determining by itself, or making query to the core network node to determine whether or not to preferentially treat the terminal by the target base station when the terminal moves from the source base station to the target base station; and
notifying to the target base station preferential information indicative of whether or not to preferentially treat the terminal by the target base station.

According to a fifth aspect of the present invention, there is provided a communication method by a gateway device which connects a source base station and a target base station to a core network, at least one terminal being connected to the source base station before movement of the terminal and being connected to the target base station after the movement of the terminal; the method comprising:
determining by the gateway device itself, or making query to a node in the core network to determine whether or not to preferentially treat the terminal by the target base station when the terminal moves from the source base station to the target base station; and
notifying to the target base station preferential information indicative of whether or not to preferentially treat the terminal by the target base station.

According to a sixth aspect of the present invention, there is provided a communication method by a base station to which at least one terminal is connected after movement of the terminal and which is connected to a core network through a gateway device, the method comprising:
receiving from the gateway device preferential information indicative of whether or not to preferentially treat the terminal by the base station.

According to a seventh aspect of the present invention, there is provided a non-transient computer-readable storage medium storing a program for a computer provided in a gateway device which connects a source base station and a target base station to a core network, at least one terminal being connected to the source base station before movement of the terminal and being connected to the target base station after the movement of the terminal, the program causing the computer to execute:
determining by the gateway device, or making query to a node in the core network to determine whether or not to preferentially treat the terminal by the target base station when the terminal moves from the source base station to the target base station; and
notifying to the target base station preferential information indicative of whether or not to preferentially treat the terminal by the target base station.

According to the present invention, when the terminal moves from the source base station to the target base station, the gateway device determines by itself whether or not to preferentially treat the terminal by the target base station, or makes a query to the core network node to determine whether or not to preferentially treat the terminal by the target base station, and notifies to the target base station the preferential information indicating whether or not to preferentially treat the terminal by the target base station.

The present invention provides the following advantage, but not restricted thereto. According to the mobile communication system, the gateway device, the base station, the communication method, and the program of the present invention, the target base station can treat the terminal which has moved to the target base station as a preferential terminal, according to the notification from the gateway device.

BRIEF DESCRIPTION OF THE DRAWINGS

FIG. 4A is a table showing a RANAP: Uplink Information Exchange Request message altered according to the first exemplary embodiment;

FIG. 4B is a table showing the RANAP: Uplink Information Exchange Request message altered according to the first exemplary embodiment;

FIG. 4C is a table showing the RANAP: Uplink Information Exchange Request message altered according to the first exemplary embodiment;

FIG. 5A is a table showing a RANAP: Uplink Information Exchange Response message altered according to the first exemplary embodiment;

FIG. 5B is a table showing the RANAP: Uplink Information Exchange Response message altered according to the first exemplary embodiment;

FIG. 5C is a table showing the RANAP: Uplink Information Exchange Response message altered according to the first exemplary embodiment;

FIG. 6 is a table showing a RANAP: Relocation Request message altered according to the first exemplary embodiment;

FIG. 7A is a table showing an image added to a determination table of the HNB-GW according to the first exemplary embodiment;

FIG. 7B is a table showing the image added to the determination table of the HNB-GW according to the first exemplary embodiment;

FIG. 10 is a table showing a RUA: Direct Transfer message altered according to the second exemplary embodiment;

FIG. 13 is a table showing an HNBRAP: Relocation Request message altered according to the third exemplary embodiment;

FIG. 14 is a table showing an HNBAP: Access Control Query message altered according to the third exemplary embodiment;

FIG. 15 is a table showing an HNBAP: Access Control Response message altered according to the third exemplary embodiment;

FIG. 18 is a table showing an X2AP: Handover Request message altered according to the fourth exemplary embodiment;

FIG. 19 is a table showing an S1AP: Access Control Query message altered according to the fourth exemplary embodiment;

FIG. 20 is a table showing an S1AP: Access Control Response message altered according to the fourth exemplary embodiment;

FIG. 23 is a table showing an S1AP: Handover Request message altered according to the fourth exemplary embodiment.

PREFERRED MODES

In the present disclosure, there are various possible modes, which include the following, but not restricted thereto. Exemplary embodiments will be described below with reference to drawings.

First Exemplary Embodiment

Figure 1:
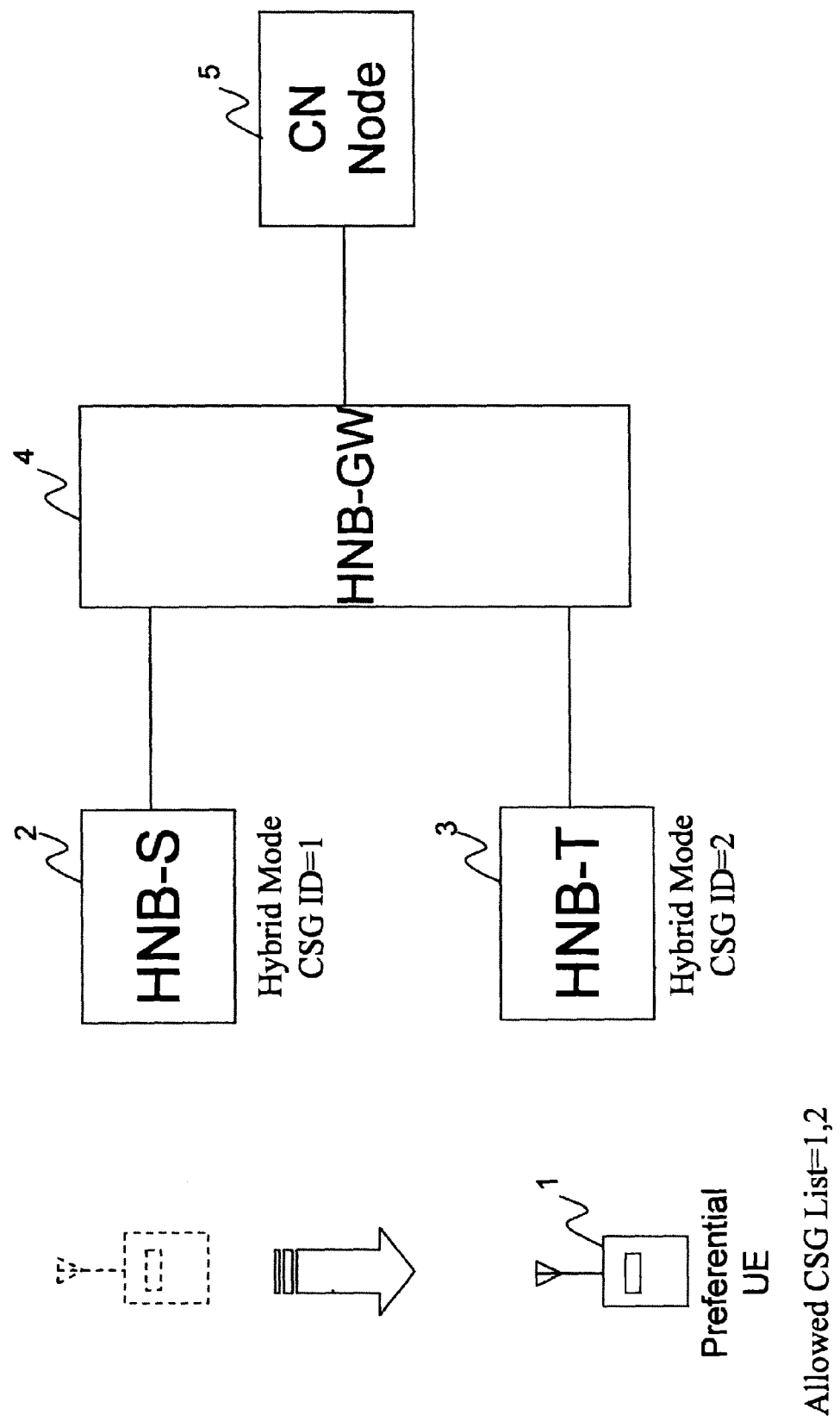
FIG. 1 is a diagram showing a configuration of a mobile communication system in each of first to third exemplary embodiments.
Figure 2:
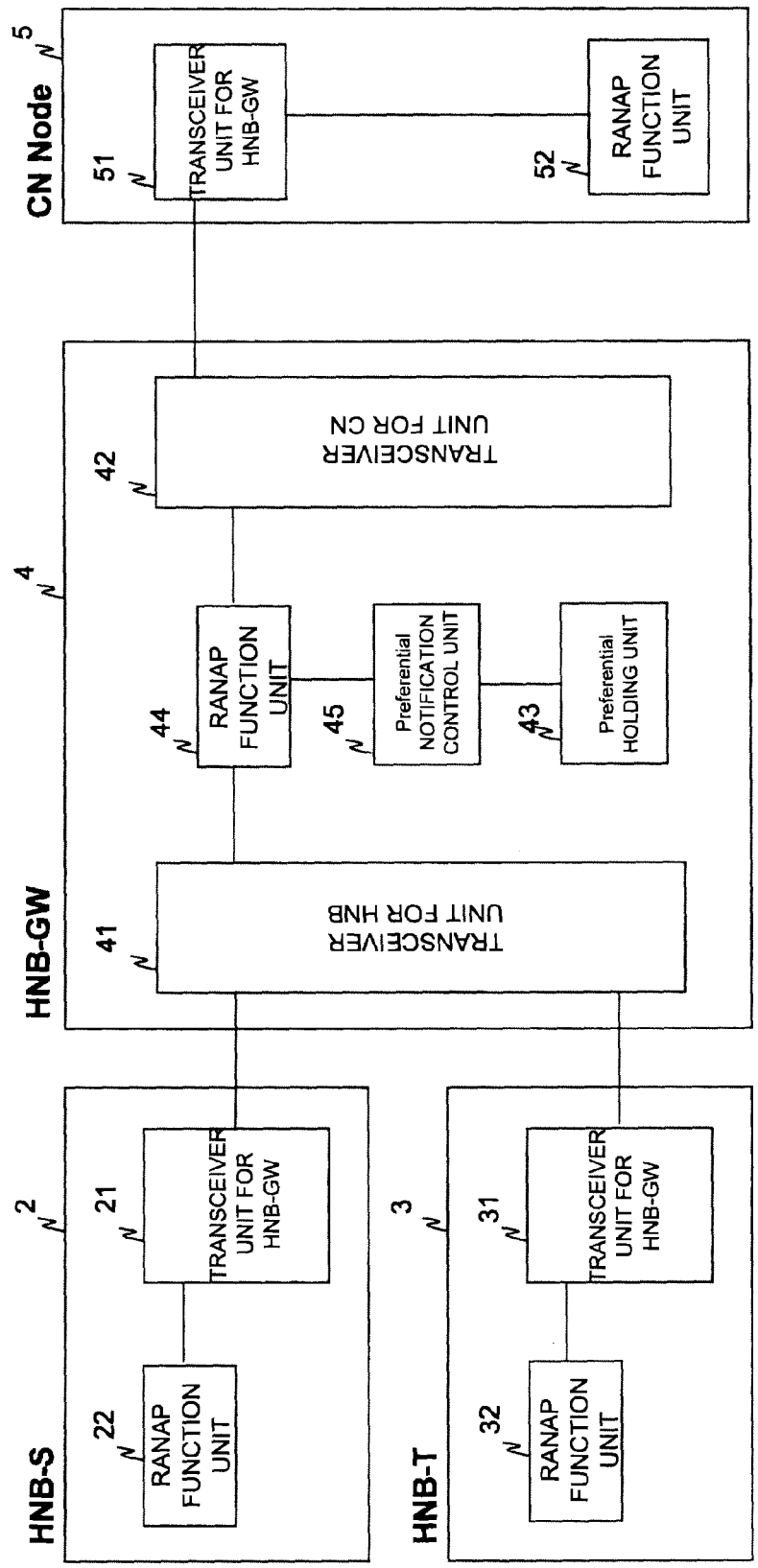
FIG. 2 is a block diagram showing internal configurations of an HNB, an HNB-GW, and a CN node in the first exemplary embodiment.

Referring to FIGS. 1 and 2, a mobile communication system in the present exemplary embodiment includes a terminal (UE) 1, a source base station (HNB-S (Source)) 2, a target base station (HNB-T (Target)) 3, a gateway device (HNB-GW) 4, and a core network (CN) node 5.

The UE 1 is a third-generation mobile cellular phone (terminal).

Each of the HNB-S 2 and the HNB-T 3 is a third-generation small base station for a home and a small office.

The HNB-S 2 is a movement source HNB to which the UE 1 is connected before movement, and the HNB-T 3 is a movement destination HNB to which the UE 1 is connected after the movement.

The HNB-GW 4 is a gateway device which connects the HNB-S 2 and the HNB-T 3 to a core network (CN).

The CN node 5 is a node provided inside the CN which is a third-generation mobile switching network.

Referring to FIG. 2, the HNB-S 2 in the present exemplary embodiment includes a transceiver unit for (communicating with) HNB-GW 21 and a RANAP (Radio Access Network Application Part) function unit 22.

The HNB-T 3 in the present exemplary embodiment includes a transceiver unit for HNB-GW 31 and a RANAP function unit 32.

The HNB-GW 4 in the present exemplary embodiment includes a transceiver unit for (communicating with) HNB 41, a transceiver unit for CN 42, a preferential holding unit 43, a RANAP function unit 44, and a preferential notification control unit 45.

The CN node 5 in the present exemplary embodiment includes a transceiver unit for (communicating with) HNB-GW 51 and a RANAP function unit 52.

Each of the transceiver units for (communicating with) HNB-GW 21, 31, and 51 includes an interface for connecting to the HNB-GW 4, and performs data transmission to and reception from the HNB-GW 4.

Each of the RANAP function units 22, 32, 44, and 52 implements a RANAP protocol function defined by 3GPP TS 25.413, and terminates a RANAP message.

The transceiver unit for HNB 41 includes an interface for connecting to the HNB-S 2 and the HNB-T 3, and performs data transmission and reception with each of the HNB-S 2 and the HNB-T 3.

The transceiver unit for CN 42 includes an interface for connecting to the CN node 5, and performs data transmission and reception with the CN node 5.

The preferential notification control unit 45 notifies to the preferential holding unit 43 CSG membership information included in the RANAP message from the CN node 5, which will be described later, and performs control about preferential notification, based on a determination table which will be described later.

The preferential holding unit 43 holds the CSG membership information notified from the preferential notification control unit 45 and notifies presence or absence of the CSG membership information to the preferential notification control unit 45 in response to a query from the preferential notification control unit 45.

An operation of the mobile communication system in the present exemplary embodiment will be described below according to the sequence diagram of FIG. 3.

When the UE 1 performs a registration process (UE registration process) for accessing the network through the HNB-S 2, message exchange is performed among the UE 1, the HNB-S 2, the HNB-GW 4, and the CN node 5. In this process, the CN node 5 may be treated as a preferential UE. In that case, the CN node 5 transmits a RANAP message including CSG membership information to the HNB-S 2 through the HNB-GW 4 in steps A1 and A2. The CSG membership information is information (allowed list information) indicative of whether or not the UE 1 is participating in the CSG of the HNB-S 2, or whether or not the CSG ID of the HNB-S 2 is included in the allowed CSG list of the UE 1. In this case, the HNB-GW 4 holds the CSG membership information included in the RANAP message in the preferential holding unit 43, in step A3.

When intra HNB-GW relocation occurs due to movement of the UE 1 from a region under control of the HNB-S 2 to a region under control of the HNB-T 3, the HNB-S 2 transmits a RANAP: Relocation Required message to the HNB-GW 4 in step A4. In this case, the HBW-GW 4 operates based on the determination table in FIGS. 7A and 7B in order to determine whether or not the UE 1 is authorized to access the HNB-T 3 and is authorized to be treated as being preferential. This determination table defines eligibility of making query to the CN node 5 and eligibility of performing preferential notification (notification of information (preferential information) indicative of whether or not to preferentially treat the UE 1) to the HNB-T 3 according to the CSG and the access mode of each of the HNB-S 2 and the HNB-T 3, identification information on the UE 1, and information indicative of whether or not the CSG ID of the HNB-S 2 is included in the allowed CSG list of UE 1. The CSG ID and the access mode of each of the HNB-S 2 and the HNB-T 3, and the identification information on the UE 1 are set in the HNB-GW 4 in advance.

In the present exemplary embodiment, the HNB-GW 4 respectively performs the following operations in steps A5 (a.) and A8 (b.) which will be described later, according to items ※1 to ※4 in FIGS. 7A and 7B:

※1:
a. The HNB-GW 4 does not make the query to the CN node 5.
b. The HNB-GW 4 performs the preferential notification to the HNB-T 3.

※2:
a. The HNB-GW 4 makes the query to the CN node 5.
b. The HNB-GW 4 determines the eligibility of performing the preferential notification to the HNB-T 3 according to notification of a result of the query from the CN node 5.

※3:
a. The HNB-GW 4 does not make the query to the CN node 5.
b. The HNB-GW 4 does not perform the preferential notification to the HNB-T 3.

※4:
a. The HNB-GW 4 makes the query to the CN node 5.
b. The HNB-GW 4 does not perform the preferential notification to the HNB-T 3.

First, the HNB-GW 4 determines whether or not to make the query to the CN node 5, based on the determination table in FIGS. 7A and 7B.

When the HNB-S 2 and the HNB-T 3 operate in a hybrid mode and CSG ID values of the HNB-S 2 and the HNB-T 3 are different (which is referred to as "inter CSG"), for example, the HNB-GW 4 makes the query to the CN node 5.

When the HNB-S 2 and the HNB-T 3 operate in the hybrid mode and the CSG ID values of the HNB-S 2 and the HNB-T 3 are the same (referred to as "intra CSG"), the HNB-GW 4 does not make the query to the CN node 5.

When the HNB-GW 4 determines to make the query to the CN node 5, the HNB-GW 4 transmits a RANAP: UL (Up Link) Information Exchange Request message to the CN node 5 in step A6.

FIGS. 4A to 4C show the RANAP: UL Information Exchange Request message altered according to the present exemplary embodiment. Parameters for notifying the CSG ID of the HNB-T 3 and the identification information on the UE 1 (IMSI/TMSI+LAI/P-TEMSI+RAI) are added to this message so that the CN node 5 determines whether or not the UE 1 is authorized to access the HNB-T 3 and is authorized to be treated as being preferential.

Next, the CN node 5 determines whether or not to treat the UE 1 as being preferential by the HNB-T 3, based on the CSG ID and the identification information on the UE 1 from the HNB-GW 4. Based on a result of the determination, the CN node 5 transmits a RANAP: UL Information Exchange Response message to the HNB-GW 4, in step A7.

FIGS. 5A to 5C show the RANAP: UL Information Exchange Response message altered according to the present exemplary embodiment. Parameters for notifying "CSG Membership Status" information are added to this message as information indicating whether or not to treat the UE 1 as being preferential.

Next, in step A8, the HNB-GW 4 determines whether or not to perform the preferential notification to the effect that the UE 1 is to be treated as being preferential to the HNB-T 3, according to the above-mentioned determination table and the information on the RANAP: UL Information Exchange Response message.

When the HNB-S 2 and the HNB-T 3 operate in the hybrid mode and the CSG ID values of the HNB-S 2 and the HNB-T 3 are different (inter CSG), as shown in FIG. 1, for example, and then when the "CSG Membership Status" information from the CN node 5 indicates that the UE 1 is to be treated as being preferential, the HNB-GW 4 performs the preferential notification.

When the HNB-S 2 and the HNB-T 3 operate in the hybrid mode and the CSG ID values of the HNB-S 2 and the HNB-T 3 are the same (intra CSG), and then when the CSG membership information from the CN node 5 indicates that the UE 1 has the CSG ID of the HNB-S 2 in the allowed CSG list of the UE 1, the HNB-G4 performs the preferential notification. Otherwise, the HNB-G4 does not perform the preferential notification.

When the HNB-GW 4 determines to perform the preferential notification, the HNB-GW 4 includes the "CSG Membership Status" information in a RANAP: Relocation Request message and transmits the RANAP: Relocation Request message to the HNB-T 3, in step A9.

FIG. 6 shows the RANAP: Relocation Request message altered according to the present exemplary embodiment. A parameter for notifying the "CSG Membership Status" information indicating that the UE 1 is to be treated as being preferential by the HNB-T 3 is added to this message.

Figure 3:
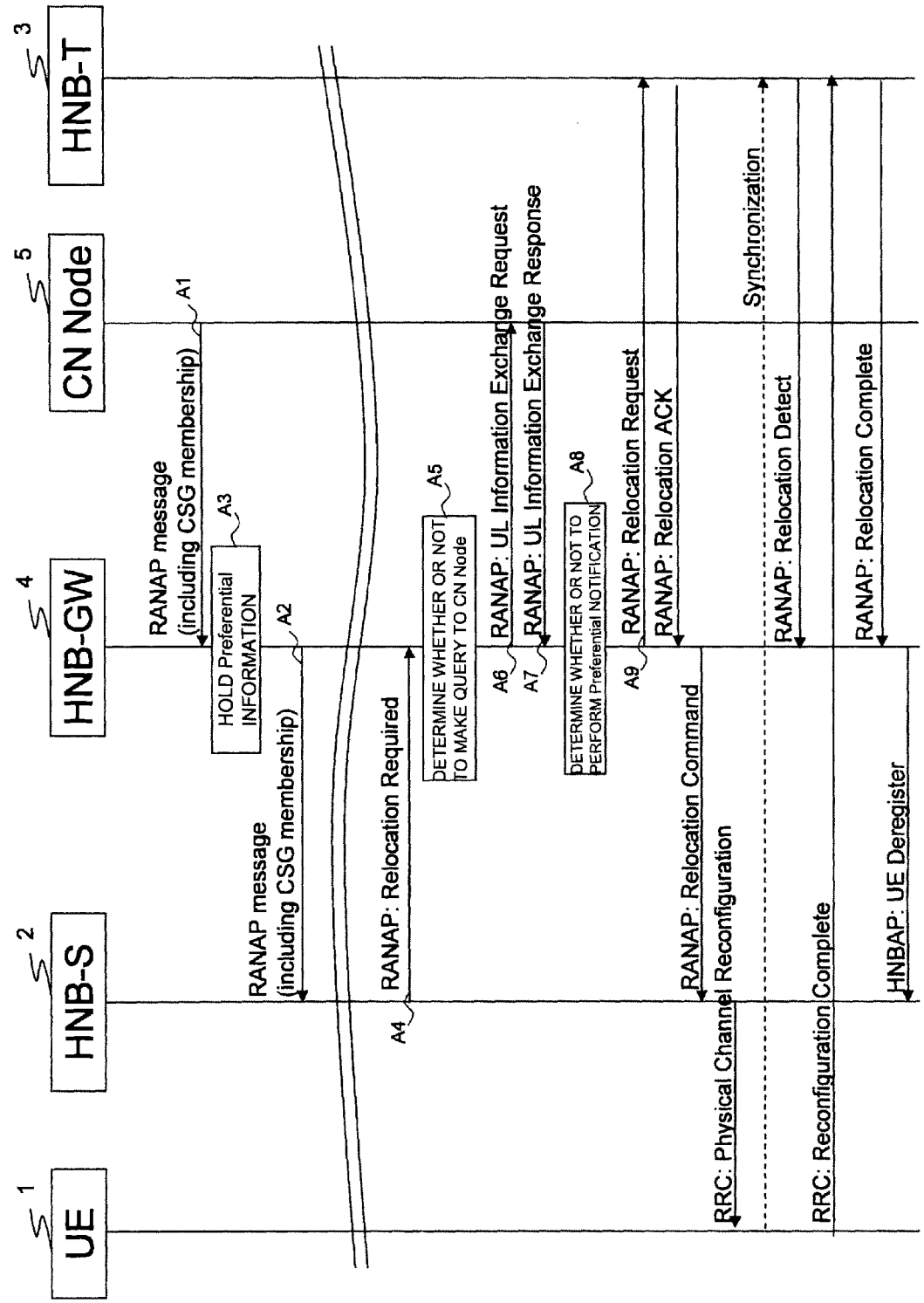
FIG. 3 is a sequence diagram explaining operation of the mobile communication system in the first exemplary embodiment.

The HNB-T 3 continues the relocation process according to the sequence diagram of FIG. 3 after the HNB-T 3 has received the RANAP: Relocation Request message. Since the procedure for this relocation process is known as the procedure for intra HNB-GW relocation, description of this procedure will be omitted.

As described above, when the intra HNB-GW relocation occurs due to the movement of the UE 1 in the present exemplary embodiment, the HNB-GW 4 determines by itself whether or not the UE 1 is to be treated as a preferential UE, or the HNB-GW 4 makes the query to the CN node 5 to determine whether or not the UE 1 is to be treated as the preferential UE. When the UE 1 is determined to be treated as the preferential UE, the HNB-GW 4 notifies the treatment of the UE 1 as the preferential UE to the HNB-T 3, using the RANAP: Relocation Request message.

Accordingly, the HNB-T 3 can treat the UE 1 as the preferential UE, according to the notification from the HNB-GW 4.

Second Exemplary Embodiment

A second exemplary embodiment will be described, with reference to FIGS. 8 to 10.

Figure 8:
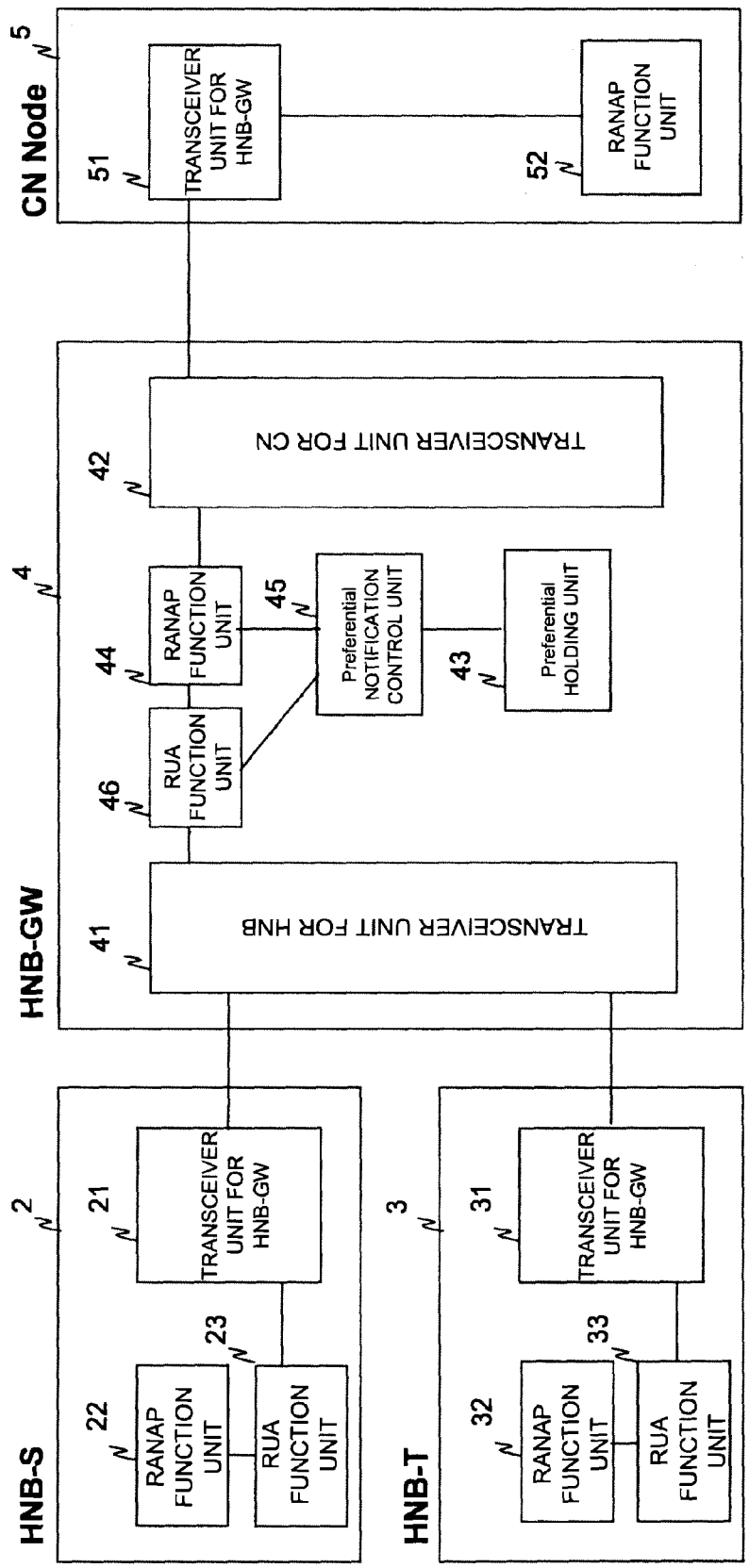
FIG. 8 is a block diagram showing internal configurations of an HNB, an HNB-GW, and a CN node in the second exemplary embodiment.

Referring to FIG. 8, a mobile communication system in the present exemplary embodiment is different from the mobile communication system in the first exemplary embodiment (in FIG. 2) in that RUA (RANAP User Adaptation) function units 23, 33, and 46 are added to an HNB-S 2, an HNB-T 3, and an HNB-GW 4, respectively.

Each of the RUA function units 23, 33, and 46 implements a RUA protocol function defined by 3GPP TS 25.468, and terminates a RUA message.

An operation of the mobile communication system in the present exemplary embodiment will be described below, according to the sequence diagram of FIG. 9.

Figure 9:
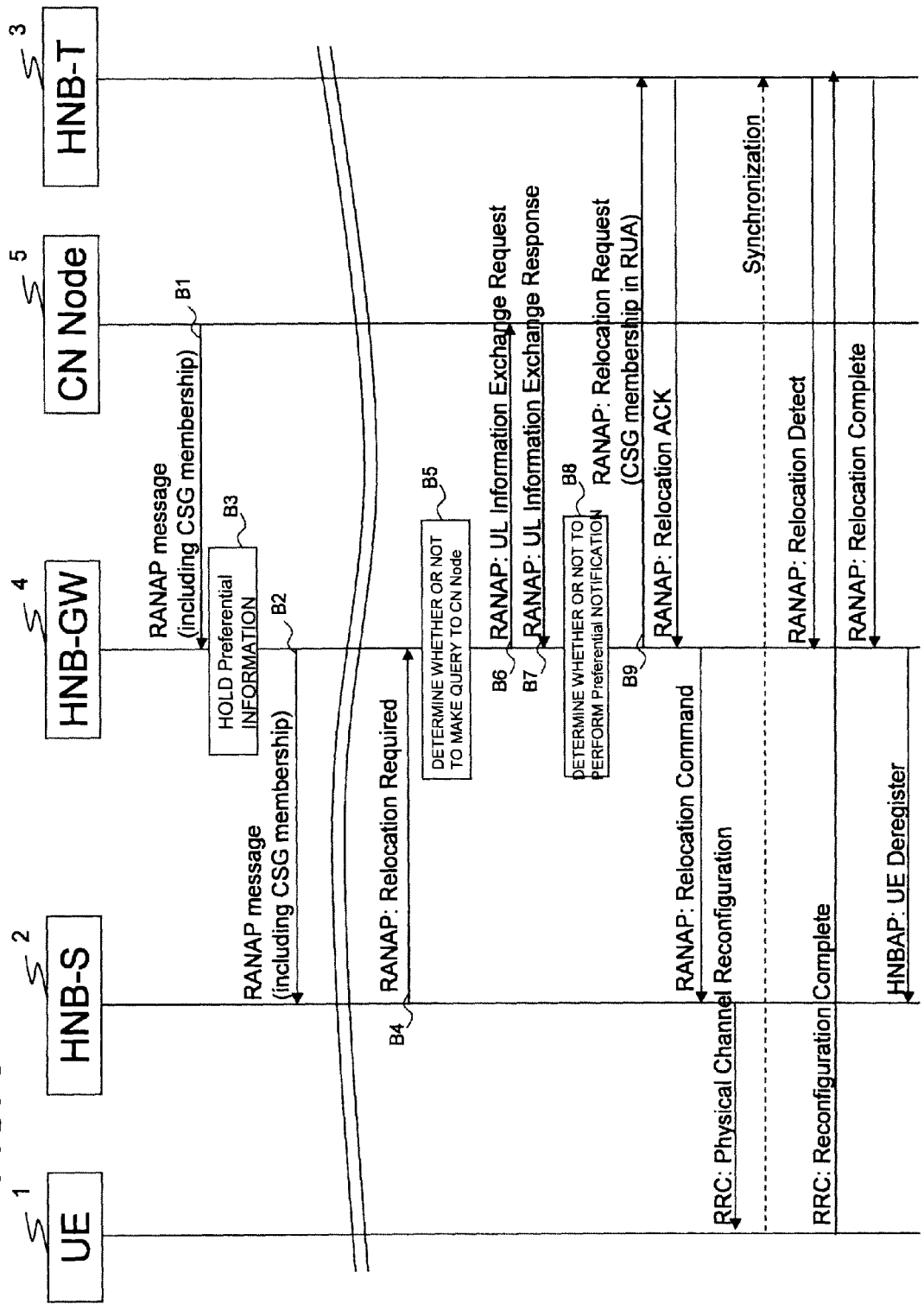
FIG. 9 is a sequence diagram explaining an operation of the mobile communication system in the second exemplary embodiment.

Referring to FIG. 9, processes in steps B1 to B8 are the same as the processes in steps A1 to A8 in FIG. 3.

FIG. 9 is different from FIG. 3 in that the HNB-GW 4 includes "CSG Membership Status" information in both of a RANAP: Relocation Request message and a RUA: Direct Transfer message, for transmission.

FIG. 10 shows the RUA: Direct Transfer message altered according to the present exemplary embodiment. A parameter for notifying the "CSG Membership Status" information is added to this message.

As described above, when intra HNB-GW relocation occurs due to movement of a UE 1 in the present exemplary embodiment, the HNB-GW 4 determines whether or not to treat the UE 1 as a preferential UE by itself, or the HNB-GW 4 makes query to a CN node 5 to determine whether or not to treat the UE 1 as the preferential UE. When it is determined that the UE 1 is treated as the preferential UE, the HNB-GW 4 notifies treatment of the UE 1 as the preferential UE to the HNB-T 3, using the RUA: Direct Transfer message.

Accordingly, the HNB-T 3 can treat the UE 1 as the preferential UE according to the notification from the HNB-GW 4.

Third Exemplary Embodiment

A third exemplary embodiment will be described, with reference to FIGS. 11 and 15.

Figure 11:
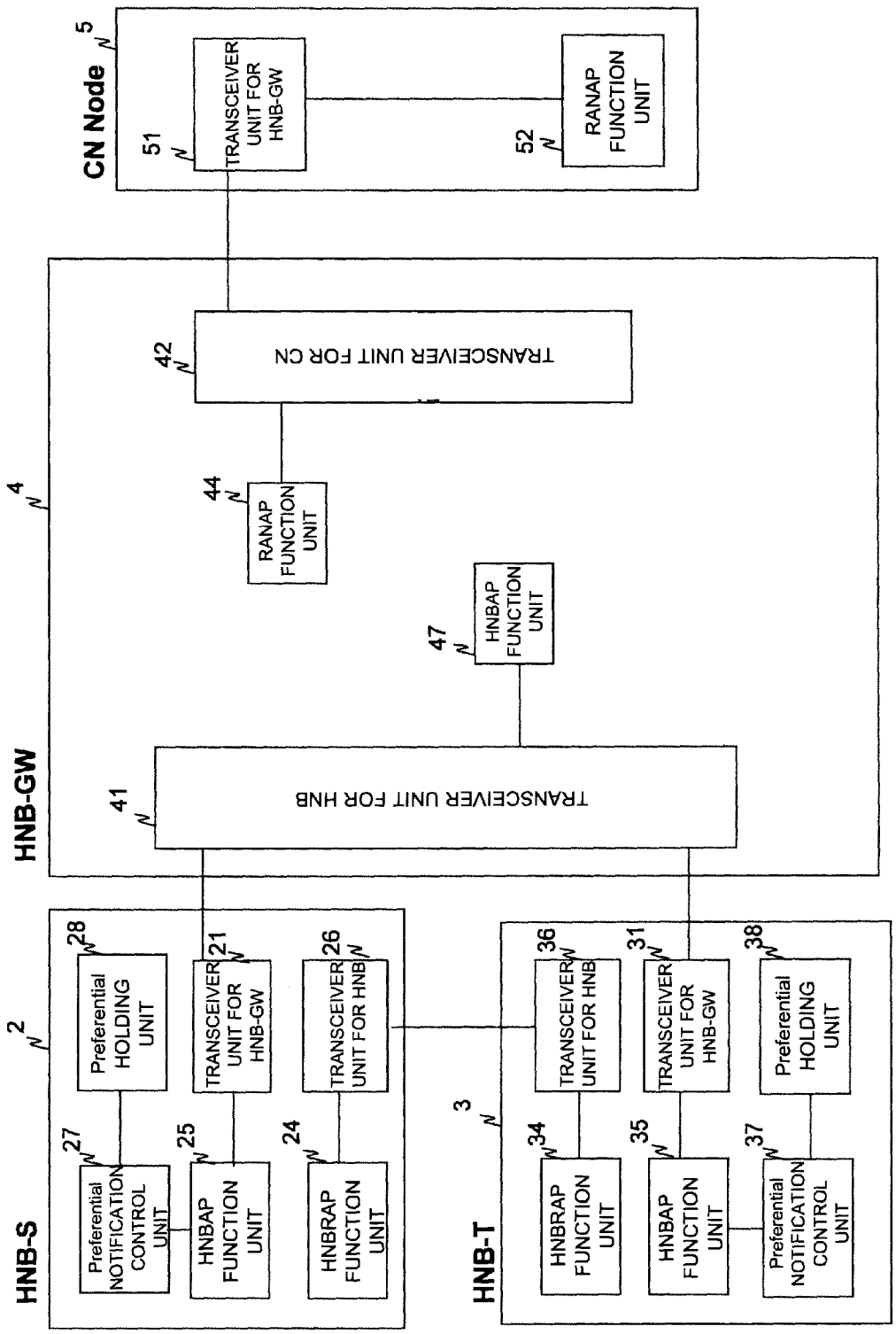
FIG. 11 is a block diagram showing internal configurations of an HNB, an HNB-GW, and a CN node in the third exemplary embodiment.

Referring to FIG. 11, a mobile communication system in the present exemplary embodiment is different from the first exemplary embodiment (in FIG. 2) in the following respects. That is, a transceiver unit for HNB 26, an HNBRAP (Home NodeB Iuhr Application Part) function unit 24, an HNBAP (HNB Application Part) function unit 25, a preferential notification control unit 27, and a preferential holding unit 28 are added to an HNB-S 2, and the RANAP function unit 22 is deleted from the HNB-S 2. Then, a transceiver unit for HNB 36, an HNBRAP function unit 34, an HNBAP function unit 35, a preferential notification control unit 37, and a preferential holding unit 38 are added to an HNB-T 3 and the RANAP function unit 32 is deleted from the HNB-T 3. Further, the mobile communication system in the present exemplary embodiment is different from the mobile communication system in the first exemplary embodiment in that an HNBAP function unit 47 is added to the HNB-GW 4, and the preferential notification control unit 45, and the preferential holding unit 43 are deleted from the HNB-GW 4.

Each of the HNBRAP function units 24 and 34 implements control message processing between HNBs referred to as an HNBRAP protocol, and terminates an HNBRAP message.

Each of the HNBAP function units 25, 35, and 47 implements an HNBAP protocol function defined by 3GPP TS 25.469, and terminates an HNBAP message.

The transceiver unit for HNB 26 includes an interface for connecting to the HNB-T 3, and performs data transmission and reception with the HNB-T 3. The transceiver unit for HNB 36 includes an interface for connecting to the HNB-S 2 and performs data transmission and reception with the HNB-S 2.

Each of the preferential notification control units 27 and 37 includes a function similar to that of the preferential notification control unit 45 in FIG. 2.

Each of the preferential holding units 28 and 38 includes a function similar to that of the preferential notification control unit 43 in FIG. 2.

An operation of the mobile communication system in the present exemplary embodiment will be described, according to the sequence diagram of FIG. 12.

When intra-HNB relocation occurs due to movement of a UE 1, the HNB-S 2 includes identification information on the UE 1 (IMSI/TMSI+LAI/P-TMSI+RAI), the CSG ID of the HNB-S 2, the access mode of the HNB-S 2, and "CSG Membership Status" information indicating whether or not the UE 1 is treated as being preferential by the HNB-S 2 in an HNBRAP: Relocation Request message, and transmits the HNBRAP: Relocation Request message to the HNB-T 3, in steps C1 and C2.

FIG. 13 shows the HNBRAP: Relocation Request message altered according to this embodiment. Parameters for notifying the identification on the UE 1, the CSG ID of the HNB-S 2, the access mode of the HNB-S 2, and the "CSG Membership Status" information are added to this message. The HNBRAP message is directly transmitted and received between the HNB-S 2 and the HNB-T 3 through the transceiver units for HNB 26 and 36 not through the HNB-GW 4.

The HNB-T 3 operates based on the determination table in FIGS. 7A and 7B in order to determine whether or not the UE 1 is authorized to access the HNB-T 3 and is authorized to be treated as being preferential.

In the present exemplary embodiment, the HNB-T 3 respectively performs the following operations in steps C3 (a.) and C8 (b.) which will be described later, according to items X·1 to X·4 in FIGS. 7A and 7B:

X·1:
a. The HNB-T 3 does not make query to the CN node 5.
b. The HNB-T 3 treats the UE 1 as being preferential.

X·2:
a. The HNB-T 3 makes the query to the CN node 5.
b. The HNB-T 3 determines eligibility of treating the UE 1 as being preferential according to notification of a result of the query from the CN node 5.

X·3.
a. The HNB-T 3 does not make the query to the CN node 5.
b. The HNB-T 3 does not treat the UE 1 as being preferential.

X·4:
a. The HNB-T 3 makes the query to the CN node 5.
b. The HNB-T 3 does not treat the UE 1 as being preferential.

First, the HNB-T 3 determines whether to make the query to the CN node 5 based on the determination table in FIGS. 7A and 7B, in step C3.

When the HNB-S 2 and the HNB-T 3 operate in the hybrid mode as shown in FIG. 1 and the CSG ID values of the HNB-S 2 and the HNB-T 3 are different (inter CSG), as shown in FIG. 1, for example, the HNB-T 3 makes the query to the CN node 5.

When the HNB-S 2 and the HNB-T 3 operate in the hybrid mode and the CSG ID values of the HNB-S 2 and the HNB-T 3 are the same (intra CSG), the HNB-T 3 does not make the query to the CN node 5.

When the HNB-T 3 determines to make the query to the CN node 5, the HNB-T 3 includes the identification information on the UE 1 (IMSI/TMSI+LAI/P-TMSI+RAI) and the CSG ID of the HNB-T 3 in an HNBAP: Access Control Query message and transmits the HNBAP: Access Control Query message to the HNB-GW 4, in step C4.

FIG. 14 shows the HNBAP: Access Control Query message altered according to the present exemplary embodiment. Parameters for notifying the identification information on the UE 1 and the CSG ID of the HNB-T 3 are added to this message.

Next, the HNB-GW 4 includes the information received from the HNB-T 3 in a RANAP: Uplink Information Exchange Request message, and transmits the RANAP: Uplink Information Exchange Request message to the CN node 5, in step C5. The alteration contents of this message are the same as that those in FIGS. 4A and 4C.

Next, the CN node 5 transmits a RANAP: Uplink Information Exchange Response message to the HNB-GW 4 in step C6. The alteration contents of this message are the same as those in FIGS. 5A to 5C.

Next, the HNB-GW 4 includes "CSG Membership Status" information indicating whether or not the UE 1 is to be treated as being preferential by the HNB-T 3 in an HNBAP: Access Control Response message and transmits the HNBAP: Access Control Response message to the HNB-T 3, in step C7.

FIG. 15 shows the HNBAP: Access Control Response message altered according to the present exemplary embodiment. A parameter for notifying the "CSG Membership Status" information is added to this message.

Next, the HNB-T 3 determines whether or not to treat the UE 1 as being preferential, based on the "CSG Membership Status" information received from the HNB-GW 4 and the determination table in FIGS. 7A and 7B, in step C8.

Assume that the HNB-S 2 and the HNB-T 3 operate in the hybrid mode and the CSG ID values of the HNB-S 2 and the HNB-T 3 are different (inter CSG), as shown in FIG. 1, for example. Then, when the "CSG Membership Status" information from the HNB-GW 4 indicates that the UE 1 is to be treated as being preferential, the HNB-T 3 treats the UE 1 as being preferential.

Assume that the HNB-S 2 and the HNB-T 3 operate in the hybrid mode and the CSG ID values of the HNB-S 2 and the HNB-T 3 are the same (intra CSG). Then, when the "CSG Membership Status" information from the HNB-S 2 indicates that the UE 1 is treated as being preferential, the HNB-T 3 treats the UE 1 as being preferential. Otherwise, the HNB-T 3 does not treat the UE 1 as being preferential.

Figure 12:
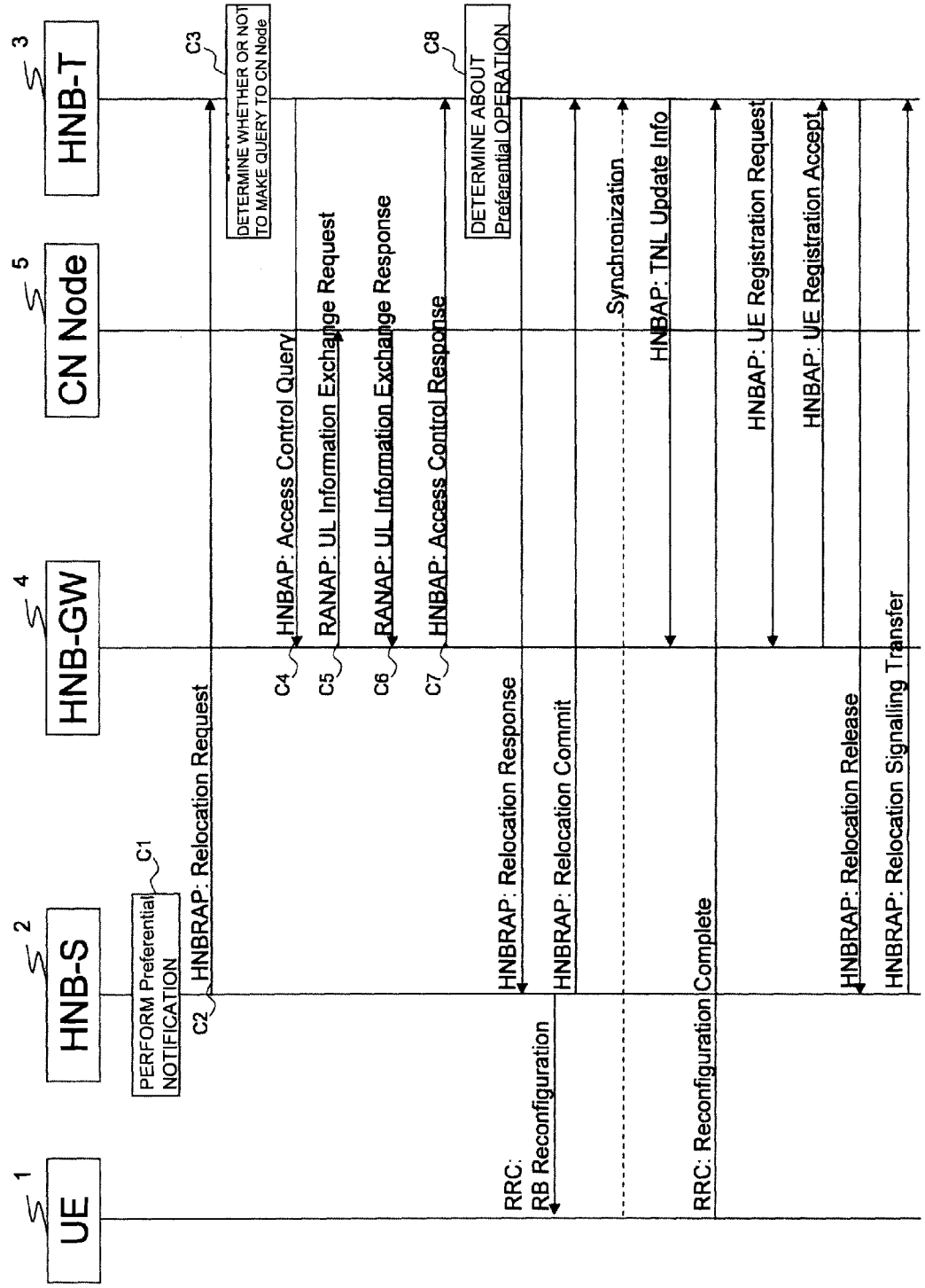
FIG. 12 is a sequence diagram explaining operation of the mobile communication system in the third exemplary embodiment.

The HNB-T 3 continues the relocation process according to the sequence diagram of FIG. 12 after the HNB-T 3 has received the HNBAP: Access Control Response message. Since the procedure for this relocation process is known as the procedure for intra HNB-GW relocation, description of this procedure will be omitted.

As described above, when the intra HNB-GW relocation occurs due to movement of the UE 1 in the present exemplary embodiment, the HNB-T 3 determines whether or not to treat the UE 1 as being a preferential UE by itself, or the NNB-T 3 makes query to the CN node 5 to determine whether or not to treat the UE 1 as the preferential UE. Consequently, according to the present exemplary embodiment, the UE 1 can be treated as the preferential UE.

Fourth Exemplary Embodiment

A fourth exemplary embodiment will be described, with reference to FIGS. 16 to 20.

Figure 16:
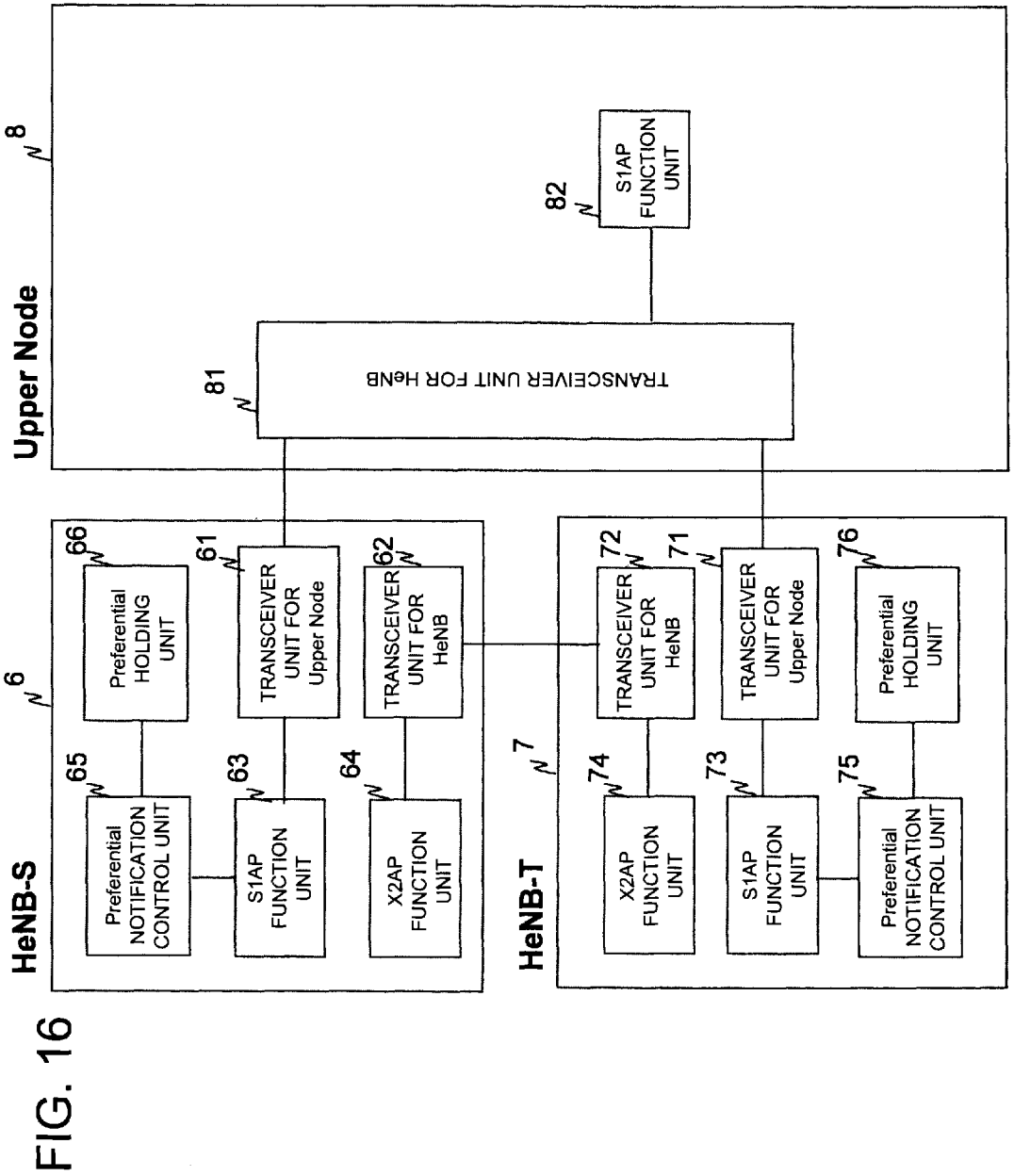
FIG. 16 is a block diagram showing internal configurations of an HeNB and an upper node in a fourth exemplary embodiment.

Referring to FIG. 16, a mobile communication system in the present exemplary embodiment has a configuration for an E-UTRAN (Evolved Universal Terrestrial Radio Access Network) architecture. The fourth exemplary embodiment is different from the third exemplary embodiment (in FIG. 11) in that the HNB-S 2 and the HNB-T 3 are respectively replaced by an HeNB (Home evolved Node B)-S 6 and an HeNB-T 7 and the HNB-GW 4/CN node 5 is replaced by an upper node 8. The fourth exemplary embodiment is different from the third exemplary embodiment in the following points. That is, in the HeNB-S 6, the transceiver unit for HNB 26 is replaced by a transceiver unit for HeNB 62, the HNBRAP function unit 24 is replaced by an X2AP (X2 Application Protocol) function unit 64, the HNBAP function unit 25 is replaced by an S1AP (S1 Application Protocol) function unit 63, and the transceiver unit for HNB-GW 21 is replaced by a transceiver unit for upper node 61. In the HeNB-T 7, the transceiver unit for HNB 36 is replaced by a transceiver unit for HeNB 72, the HNBRAP function unit 34 is replaced by an X2AP (X2 Application Protocol) function unit 74, the HNBAP function unit 35 is replaced by an S1AP (S1 Application Protocol) function unit 73, and the transceiver unit for HNB-GW 31 is replaced by a transceiver unit for upper node 71. The upper node 8 includes a transceiver unit for HeNB 81 and an S1AP function unit 82.

The HeNB-S 6 and HeNB-T 7 are small radio base stations for a home and a small office, for an E-UTRAN.

The upper node 8 is the one for accommodating the HeNB-S 6 and HeNB-T 7, and is implemented by an MME (Mobility Management Entity) alone or a combination of the MME and a HeNB-GW, for example.

The transceiver unit for HeNB 81 includes an interface for connecting to the HeNB-S 6 and the HeNB-T 7, and performs data transmission and reception with each of the HeNB-S 6 and the HeNB-T 7. The transceiver unit for HeNB 62 includes an interface for connecting to the HeNB-T 7, and performs data transmission and reception with the HeNB-T 7. The transceiver unit for HeNB 72 includes an interface for connecting to the HeNB-S 6, and performs data transmission and reception with the HeNB-S 6.

Each of the S1AP function units 63, 73, and 82 implements an S1AP protocol function defined by 3GPP TS 36.413, and terminates an S1AP message.

Each of the X2AP function units 64 and 74 implements an X2AP protocol function defined by 3GPP TS 36.423, and terminates an X2AP message.

Each of the transceiver units for upper node 61 and 71 includes an interface for connecting to the upper node 8, and performs data transmission and reception with the upper node 8.

An operation of the mobile communication system in the present exemplary embodiment will be described according to the sequence diagram of FIG. 17.

When handover occurs due to movement of a UE 1, the HeNB-S 6 includes identification information (GUMMEI) on the UE 1, the CSG ID of the HeNB-S 6, the access mode of the HeNB-S 6, and "CSG Membership Status" information indicative of whether or not the UE 1 is treated as being preferential by the HeNB 6 in an X2AP: Handover Request message and then transmits the X2AP: Handover Request message to the HeNB-T 7, in steps D1 and D2.

FIG. 18 shows the X2AP: Handover Request message altered according to the present exemplary embodiment. Parameters for notifying the identification information on the UE 1, the CSG ID of the HeNB-S 6, the access mode of the HeNB-S 6, and the "CSG Membership Status" information are added to this message. THE X2AP message is directly transmitted and received between the HeNB-S 6 and the HeNB-T 7 through the transceiver units for HeNB 62 and 72, not through the upper node 8.

The HeNB-T 7 operates based on the determination table of FIGS. 7A and 7B in order to determine whether or not the UE 1 is authorized to access the HeNB-T 7 and is authorized to be treated as being preferential.

In the present exemplary embodiment, the HeNB-T 7 respectively performs the following operations in steps D3 (a.) and D6 (b.) which will be described later, according to items X.1 to X.4 in FIGS. 7A and 7B:

X.1:
a. The HeNB-T 7 does not make query to the upper node 8.
b. The HeNB-T 7 treats the UE 1 as being preferential.

X·2:
a. The HeNB-T 7 makes the query to the upper node 8.
b. The HeNB-T 7 determines eligibility of treating the UE 1 as being preferential according to notification of a result of the query from the upper node 8.
X·3:
a. The HeNB-T 7 does not make the query to the upper node 8.
b. The HeNB-T 7 does not treat the UE 1 as being preferential.
X·4:
a. The HeNB-T 7 makes the query to the upper node 8.
b. The HeNB-T 7 does not treat the UE 1 as being preferential.

First, the HeNB-T 7 determines whether or not to make the query to the upper node 8 based on the determination table of FIGS. 7A and 7B, in step D3.

When the HeNB-T 7 determines to make the query to the upper node 8, the HeNB-T 7 includes the identification information (GUUMMEI) on the UE 1 and the CSG ID of the HeNB-T 7 in an S1AP: Access Control Query message, and then transmits the S1AP: Access Control Query message to the upper node 8, in step D4.

FIG. 19 shows the S1AP: Access Control Query message altered according to the present exemplary embodiment. Parameters notifying the identification information on the UE 1 and the CSG ID of the HeNB-T 7 are added to this message.

Next, in step D5, the upper node 8 includes "CSG membership" information indicating whether or not the UE 1 is to be treated as being preferential by the HeNB-S 7 in an S1AP: Access Control Response message, and then transmits the S1AP: Access Control Response message to the HeNB-T 7.

FIG. 20 shows the S1AP: Access Control Response message altered according to the present exemplary embodiment. A parameter notifying the "CSG Membership Status" information is added to this message.

Next, the HeNB-T 7 determines whether or not to treat the UE 1 as being preferential, based on the "CSG Membership Status" information received from the upper node 8 and the determination table of FIGS. 7A and 7B, in step D6.

Figure 17:
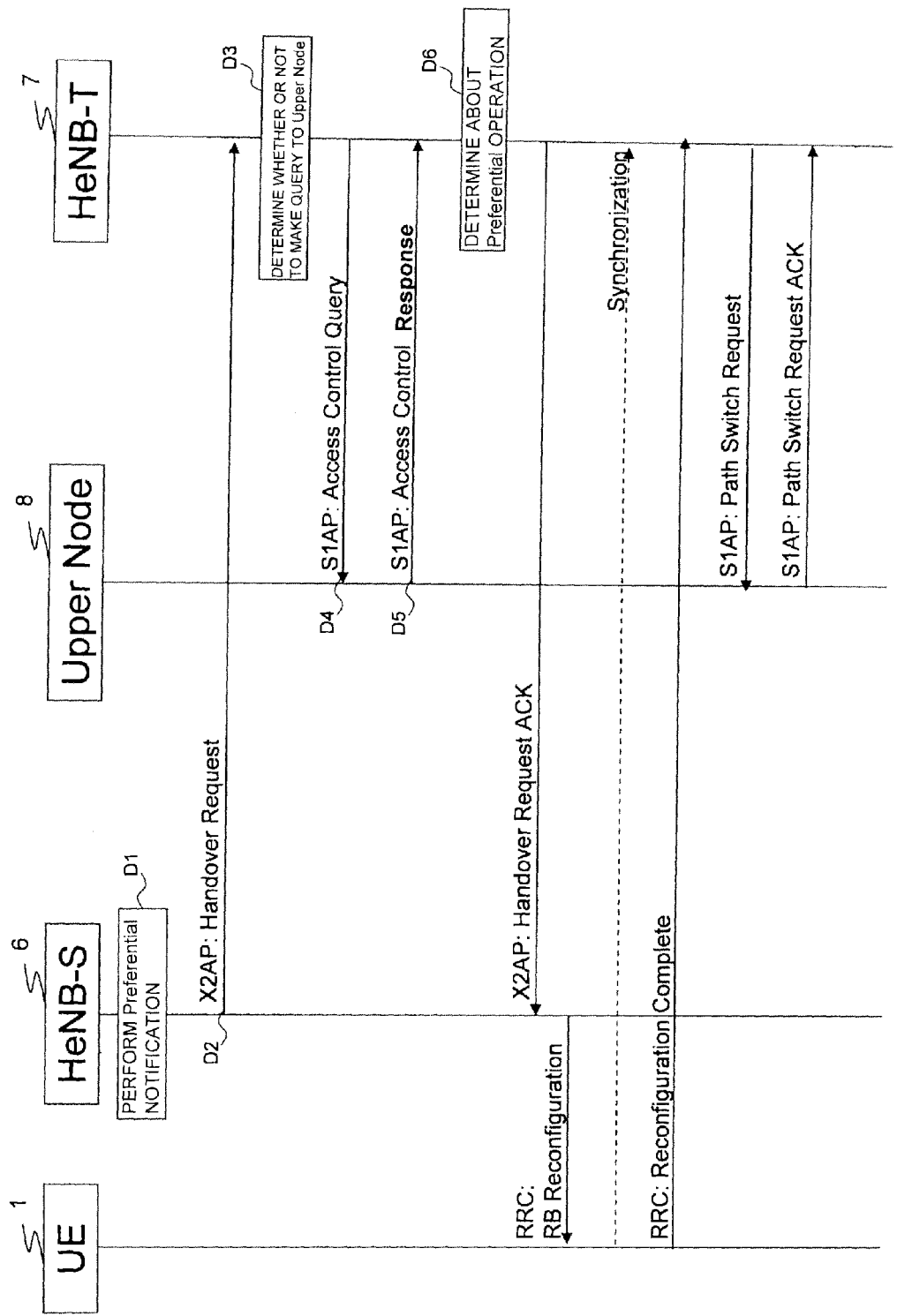
FIG. 17 is a sequence diagram explaining operation of a mobile communication system in the fourth exemplary embodiment.

The HeNB-T 7 continues the handover process according to the sequence diagram of FIG. 17 after the HeNB-T 7 has received the S1AP: Access Control Response message. Since the procedure for this handover process is well known, description of the procedure will be omitted.

As described above, when the handover occurs due to movement of the UE 1 in the present exemplary embodiment, the HeNB-T 7 determines whether or not to treat the UE 1 as a preferential UE by itself, or the HeNB-T 7 makes the query to the upper node 8 to determine whether or not to treat the UE 1 as the preferential UE. Consequently, according to the present exemplary embodiment, the UE 1 can be treated as the preferential UE.

Fifth Exemplary Embodiment

A fifth exemplary embodiment will be described, with reference to FIGS. 21 and 23.

Figure 21:
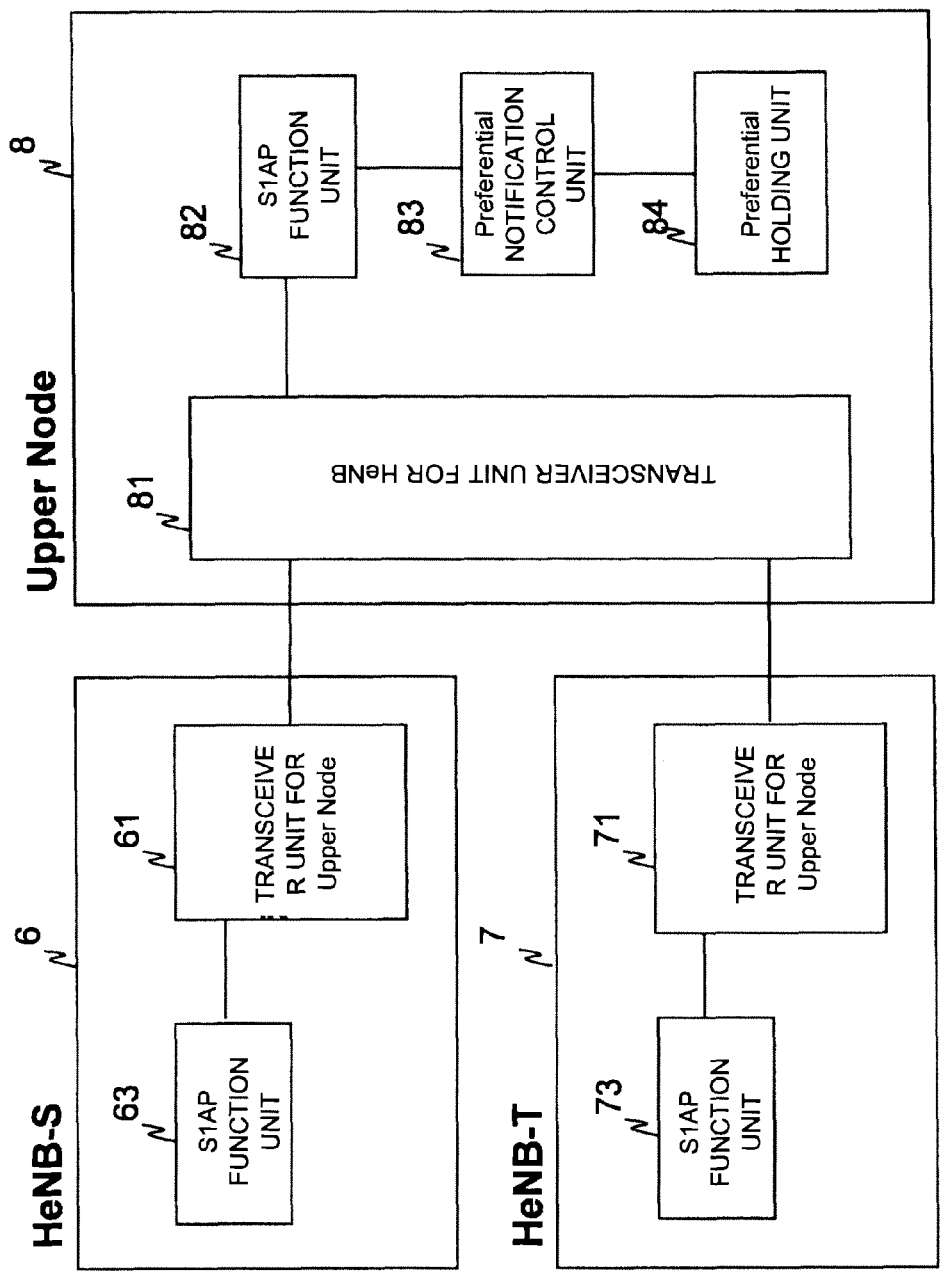
FIG. 21 is a block diagram showing internal configurations of an HeNB and an upper node in a fifth exemplary embodiment.

Referring to FIG. 21, a mobile communication system in the present exemplary embodiment does not use an X2AP function in signal processing in handover. The mobile communication system in FIG. 21 is different from the mobile communication system in FIG. 16 in the following respects. That is, the transceiver unit for HeNB 62, the X2AP function unit 64, the preferential notification control unit 65, and the preferential holding unit 66 are deleted from the HeNB-S 6. Further, the transceiver unit for HeNB 72, the X2AP function unit 74, the preferential notification control unit 75, and the preferential holding unit 76 are deleted from the HeNB-T 7. The mobile communication system in the present exemplary embodiment is different from the mobile communication system in FIG. 16 in that a preferential notification control unit 83 and a preferential holding unit 84 are added to the upper node 8.

An operation of the mobile communication system in the present exemplary embodiment will be described below, according to the sequence diagram of FIG. 22.

When handover occurs due to movement of a UE 1, the HeNB-S 6 transmits an S1AP: Handover Required message to the upper node 8, in step E1.

The upper node 8 operates, based on the determination table of FIGS. 7A and 7B in order to determine whether or not the UE 1 is authorized to access the HeNB-T 7 and is authorized to be treated as being preferential. CSG membership information on the HeNB-S 6, the CSG ID and the access mode of each of the HeNB-S 6 and the HeNB-T 7, and identification information on the UE 1 are set in the upper node 8 in advance.

The upper node 8 in the present exemplary embodiment respectively performs the following operations according to X·1 to X·4 in FIGS. 7A and 7B, in step E2 (a.) which will be described later:
X·1:
a. The upper node 8 treats the UE 1 as being preferential.
X·2:
a. The upper node 8 determines whether or not to treat the UE 1 as being preferential, based on registration information on the UE 1.
X·3:
a. The upper node 8 does not treat the UE 1 as being preferential.
X·4:
a. The upper node 8 does not treat the UE 1 as being preferential.

When the upper node 8 determines to treat the UE 1 as being preferential based on the determination table of FIGS. 7A and 7B in step E2, the upper node 8 includes "CSG Membership Status" information indicating that the UE 1 is to be treated as being preferential by the HeNB-T 7 in an S1AP: Handover Request message, and transmits the S1AP: Handover Request message to the HeNB-T 7.

FIG. 23 shows the S1AP: Handover Request message altered according to the present exemplary embodiment. A Parameter for notifying the "CSG Membership Status" information is added to this message.

Figure 22:
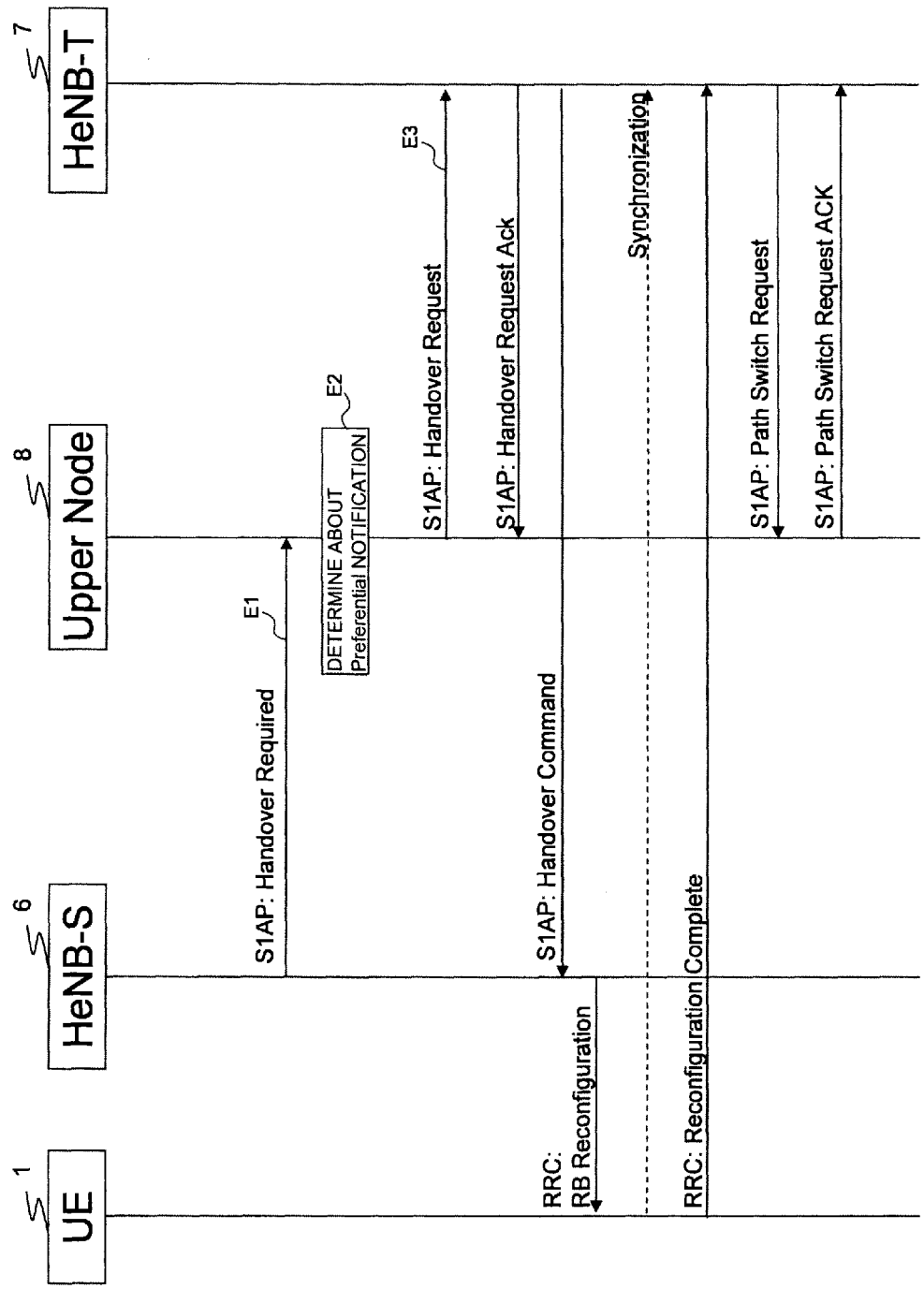
FIG. 22 is a sequence diagram explaining operation of a mobile communication system in the fifth exemplary embodiment.

The HeNB-T 7 continues the handover process according to the sequence diagram of FIG. 22 after the HeNB-T 7 has received the S1AP: Handover Request message. The procedure for this handover process is a well known process. Thus, description of the handover process will be omitted As described above, when the handover occurs due to movement of the UE 1 in the present exemplary embodiment, the upper node 8 determines whether or not to treat the UE 1 as a preferential UE. When the upper node 8 determines to treat the UE 1 as the preferential UE, the upper node 8 notifies treatment of the UE 1 as the preferential UE to the HeNB-T 7 using the S1AP: Handover Request message.

Consequently, the HeNB-T7 can treat the UE 1 as the preferential UE according to the notification of the upper node 8.

Overviews of First and Second Exemplary Embodiments

Figure 24:
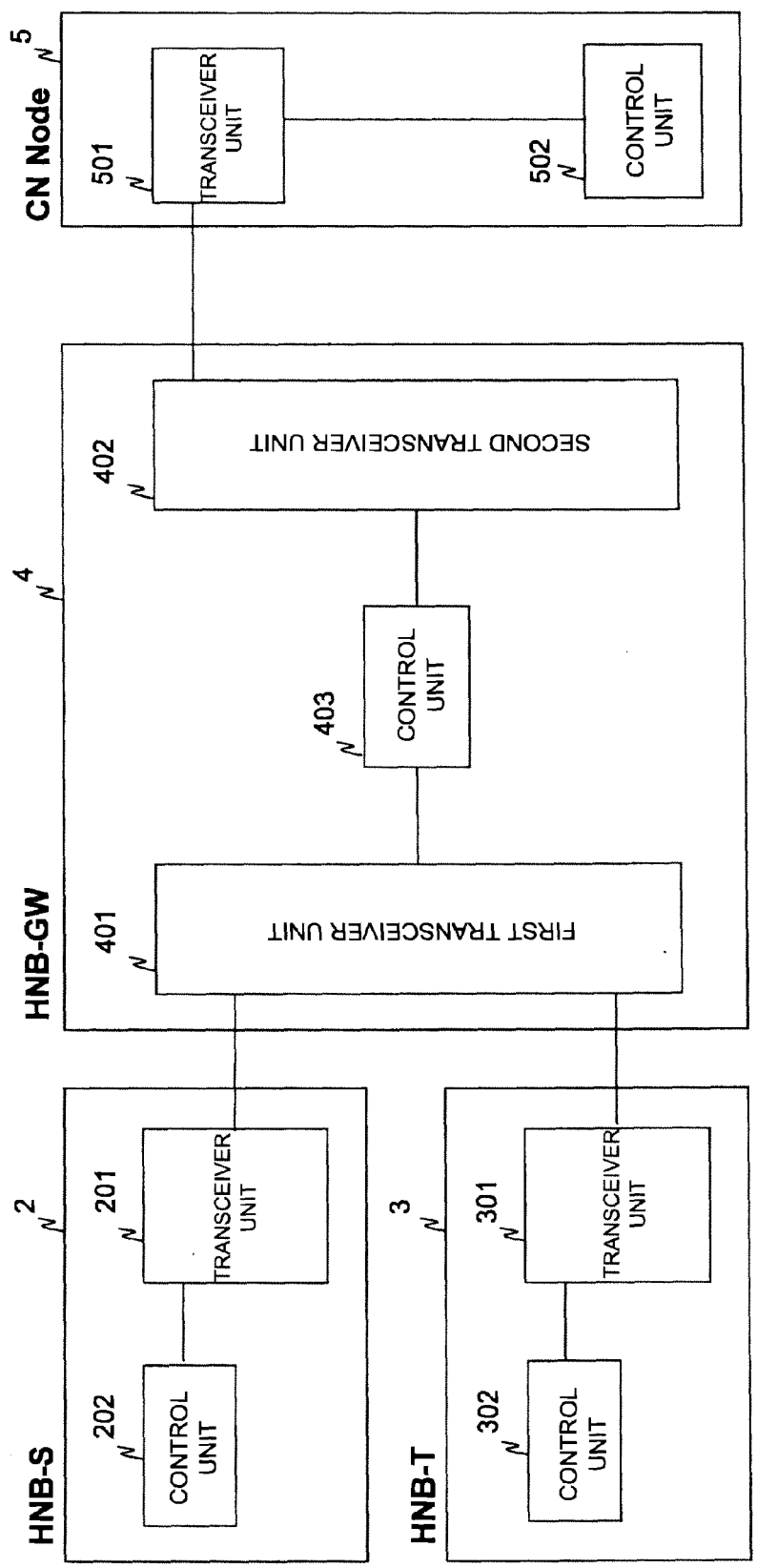
FIG. 24 is a block diagram showing an overview of an internal configuration of the mobile communication system in each of the first and second exemplary embodiments.

Overviews of the first and second exemplary embodiments will be described, with reference to FIG. 24.

The mobile communication system in each of the first and second exemplary embodiments includes the terminal (UE) 1, the source base station (HNB-S) 2, the target base station (HNB-T) 3, the gateway device (HNB-GW) 4, and the core network node (CN node) 5.

The HNB-S 2 includes a transceiver unit 201 and a control unit 202.

The transceiver unit 201 corresponds to the transceiver unit for HNB-GW 21 in FIG. 2, and the control unit 202 corresponds to the RANAP function unit 22 in FIG. 2.

The HNB-T 3 includes a transceiver unit 301 and a control unit 302.

The transceiver unit 301 corresponds to the transceiver unit for HNB-GW 31 in FIG. 2, and receives from the HNB-GW 4 preferential information (preferential notification) indicating whether or not to preferentially treat the UE 1 by the HNB-T 3.

The control unit 302 corresponds to the RANAP function unit 32 in FIG. 2.

The HNB-GW 4 includes a first transceiver unit 401, a second transceiver unit 402, and a control unit 403.

The second transceiver unit 402 corresponds to the transceiver unit for CN 42 in FIG. 2.

The control unit 403 corresponds to the preferential holding unit 43, the RANAP function unit 44, and the preferential notification control unit 45 in FIG. 2. When the intra HNB-GW relocation occurs, the control unit 403 determines whether or not to preferentially treat the UE 1 by the HNB-T 3 by itself. Alternatively, the control unit 403 makes query to the CN node 5 to determine whether or not to preferentially treat the UE 1, through the second transceiver unit 402.

The first transceiver unit 401 corresponds to the transceiver unit for HNB 41 in FIG. 2, and transmits to the HNB-T 3 the preferential information (preferential notification) indicating whether or not to preferentially treat the UE 1 by the HNB-T 3.

The CN node 5 includes a transceiver unit 501 and a control unit 502.

The transceiver unit 501 corresponds to the transceiver unit for HNB-GW 51 in FIG. 2, and the control unit 502 corresponds to the RANAP function unit 52 in FIG. 2.

As described above, in the first and second exemplary embodiments, when the intra HNB-GW relocation occurs, the HNB-GW 4 determines by itself whether or not to treat the UE 1 as the preferential UE, or the HNB-GW 4 makes the query to the CN node 5 to determine whether or not to treat the UE 1 as the preferential UE. When it is determined that the UE 1 is treated as the preferential UE, the HNB-GW 4 notifies to the HNB-T 3 treatment of the UE 1 as the preferential UE.

Accordingly, the HNB-T 3 can treat the UE 1 as the preferential UE, according to the notification from the HNB-GW 4.

In the first and second exemplary embodiments, the control unit 403 includes the determination table defining the eligibility of making the query to the CN node 5 and the eligibility of notifying the preferential information (preferential notification) to the HNB-T 3 based on the closed subscriber group identification information (CSG IDs) on the HNB-S 2 and the HNB-T 3, the access modes of the HNB-S 2 and the HNB-T 3, the identification information on the UE 1, the allowed list information (CSG membership information) indicating whether or not the closed subscriber group identification information on the HNB-S 2 is included in the allowed list (allowed CSG list) of the UE 1. When the intra HNB-GW relocation occurs, the eligibility of making the query to the CN node 5 and the eligibility of notifying the preferential information to the HNB-T 3 are determined, based on the determination table.

In the first and second exemplary embodiments, when the UE 1 is registered, the second transceiver unit 402 receives the RANAP message from the CN node 5, and when the allowed list information (CSG membership information) is included in the RANAP message, the control unit 403 holds the allowed list information.

When the query to the CN node 5 is made in the first and second exemplary embodiments, the control unit 403 includes the identification information on the UE 1 and the closed subscriber group identification information (CSG ID) on the HNB-T 3 in the RANAP: Uplink Information Exchange Request message. The second transceiver unit 402 transmits the RANAP: Uplink Information Exchange Request message to the CN node 5.

When the CN node 5 receives the query from the HNB-GW 4 in the first and second exemplary embodiments, the control unit 502 includes the preferential information (preferential notification) in the RANAP: Uplink Information Exchange Response message, and the transceiver unit 501 transmits the RANAP: Uplink Information Exchange Response message to the HNB-GW 4. Then, the second transceiver unit 402 receives the RANAP: Uplink Information Exchange Response message.

When the preferential information is notified (preferential notification is made) to the HNB-T 3 in the first exemplary embodiment, the control unit 403 includes the preferential information in the RANAP: Relocation Request message. The first transceiver unit 401 transmits the RANAP: Relocation Request message to the HNB-T 3.

When the preferential information is notified (preferential notification is made) to the HNB-T 3 in the second exemplary embodiment, the control unit 403 includes the preferential information in the RUA: Direct Transfer message. The first transceiver unit 401 transmits the RUA: Direct Transfer message to the HNB-T 3.

The method which is executed by the HNB-S 2, the HNB-T 3, the HNB-GW 4, the CN node 5, the HeNB-S 6, the HeNB-T 7, and the upper node 8 may be applied to a program to be executed by a computer. The program can also be stored in a storage medium, or can also be provided to an outside through the network. Modifications and adjustments of the exemplary embodiment are possible within the scope of the overall disclosure (including the claims) of the present invention and based on the basic technical concept of the present invention. Various combinations and selections of various disclosed elements (including each element of each claim, each element of each exemplary embodiment, each element of each drawing, etc.) are possible within the scope of the claims of the present invention. That is, the present invention of course includes various variations and modifications that could be made by those skilled in the art according to the overall disclosure including the claims and the technical concept.

EXPLANATION OF SYMBOLS 1 terminal (UE)
2 source base station (HNB-S)
3 target base station (HNB-T)

4 gateway device (HNB-GW)
5 core network node (CN node)
6 HeNB-S
7 HeNB-T
8 upper node
21 transceiver unit for (communicating with) HNB-GW
22 RANAP function unit
23 RUA function unit
24 HNBRAP function unit
25 HNBAP function unit
26 transceiver unit for (communicating with) HNB
27 preferential notification control unit
28 preferential holding unit
31 transceiver unit for HNB-GW
32 RANAP function unit
33 RUA function unit
34 HNBRAP function unit
35 HNBAP function unit
36 transceiver unit for HNB
37 preferential notification control unit
38 preferential holding unit
41 transceiver unit for HNB
42 transceiver unit for (communicating with) CN
43 preferential holding unit
44 RANAP function unit
45 preferential notification control unit
45 RUA function unit
47 HNBAP function unit
51 transceiver unit for HNB-GW
52 RANAP function unit
61 transceiver unit for upper node
62 transceiver unit for (communicating with) HeNB
63 S1AP function unit
64 X2AP function unit
65 preferential notification control unit
66 preferential holding unit
71 transceiver unit for upper node
72 transceiver unit for HeNB
73 S1AP function unit
74 X2AP function unit
75 preferential notification control unit
76 preferential holding unit
81 transceiver unit for HeNB
82 S1AP function unit
83 preferential notification control unit
84 preferential holding unit
201 transceiver unit
202 control unit
301 transceiver unit
302 control unit
401 first transceiver unit
402 second transceiver unit
403 control unit
501 transceiver unit
502 control unit

What is claimed is:

1. A mobile communication system comprising:
   at least one terminal;
   a source base station to which the terminal is connected before movement of the terminal;
   a target base station to which the terminal is connected after the movement of the terminal;
   a gateway device that connects the source base station and the target base station to a core network; and
   a core network node provided in the core network, wherein:
   the gateway device determines by itself, or makes query to the core network node to determine whether or not to preferentially treat the terminal by the target base station when the terminal moves from the source base station to the target base station
   the gateway device notifies to the target base station preferential information indicative of whether or not to preferentially treat the terminal by the target base station;
   the terminal holds an allowed list that is a list of closed subscriber group identification information on a base station to which the terminal is connectable;
   the gateway device comprises a determination table that prescribes eligibility of making query to the core network node and eligibility of notifying the preferential information to the target base station, in accordance with closed subscriber group identification information on the source base station, closed subscriber group identification information on the target base station, access modes of the source base station and the target base station, identification information on the terminal, and allowed list information indicative of whether or not the allowed list of the terminal includes the closed subscriber group identification information on the source base station; and
   the gateway device determines based on the determination table the eligibility of making the query to the core network node and the eligibility of notifying the preferential information to the target base station when the terminal moves from the source base station to the target base station.

2. The mobile communication system according to claim 1, wherein the gateway device receives a Radio Access Network Application Part RANAP message from the core network node when the terminal is registered, and holds the allowed list information when the RANAP message includes the allowed list information.

3. The mobile communication system according to claim 1, wherein the gateway device includes the identification information on the terminal and the closed subscriber group identification information on the target base station in a RANAP: Uplink Information Exchange Request message and transmits the RANAP: Uplink Information Exchange Request message to the core network node when the gateway device makes the query to the core network node.

4. The mobile communication system according to claim 3, wherein the core network node includes the preferential information in a RANAP: Uplink Information Exchange Response message and transmits the RANAP: Uplink Information Exchange Response message to the gateway device when the core network node receives the query from the gateway device.

5. The mobile communication system according to claim 1, wherein the gateway device includes the preferential information in a RANAP: Relocation Request message and transmits the RANAP: Relocation Request message to the target base station when the gateway device notifies the preferential information to the target base station.

6. The mobile communication system according to claim 1, wherein the gateway device includes the preferential information in a RANAP User Adaptation RUA: Direct Transfer message and transmits the RUA: Direct Transfer message to the target base station when the gateway device notifies the preferential information to the target base station.

7. A gateway device, which connects a source base station and a movement destination station to a core network, at least one terminal being connected to the source base station before movement of the terminal and being connected to the target base station after the movement of the terminal, the gateway device comprising:
- a control unit that determines by itself, or makes query to a core network node in the core network to determine whether or not to preferentially treat the terminal by the target base station when the terminal moves from the source base station to the target base station; and
- a first transceiver unit that notifies to the target base station preferential information indicative of whether or not to preferentially treat the terminal by the target base station, wherein:
- the terminal holds an allowed list that is a list of closed subscriber group identification information on a base station to which the terminal itself is connectable;
- the control unit comprises a determination table that prescribes eligibility of making the query to the core network node and eligibility of notifying the preferential information to the target base station, in accordance with closed subscriber group identification information on the source base station and closed subscriber group identification information on the target base station, access modes of the source base station and the target base station, identification information on the terminal, and allowed list information indicative of whether or not the allowed list of the terminal includes the closed subscriber group identification information on the source base station; and
- the control unit determines based on the determination table the eligibility of making the query to the core network node and the eligibility of notifying the preferential information to the target base station when the terminal moves from the source base station to the target base station.

8. The gateway device according to claim 7, further comprising:
- a second transceiver unit that receives a Radio Access Network Application Part RANAP message from the core network node when the terminal is registered, wherein the control unit holds the allowed list information when the RANAP message includes the allowed list information.

9. The gateway device according to claim 8, wherein the control unit includes the identification information on the terminal and the closed subscriber group identification information on the target base station in a RANAP: Uplink Information Exchange Request message when the control unit makes the query to the core network node; and
- the second transceiver unit transmits the RANAP: Uplink Information Exchange Request message to the core network node.

10. The gateway device according to claim 9, wherein the second transceiver unit receives a RANAP: Uplink Information Exchange Response message including the preferential information from the core network node.

11. The gateway device according to claim 7, wherein:
- the control unit includes the preferential information in a RANAP: Relocation Request message when the control unit notifies the preferential information to the target base station; and
- the first transceiver unit transmits the RANAP: Relocation Request message to the target base station.

12. The gateway device according to claim 7, wherein:
- the control unit includes the preferential information in a RANAP User Adaptation RUA: Direct Transfer message when the control unit notifies the preferential information to the target base station; and
- the first transceiver unit transmits the RUA: Direct Transfer message to the target base station.

13. A communication method in a mobile communication system comprising:
- at least one terminal; a source base station to which the terminal is connected before movement of the terminal; a target base station to which the terminal is connected after the movement of the terminal; a gateway device that connects the source base station and the target base station to a core network; and a core network node provided in the core network,
- the method comprising:
- by the gateway device, determining by itself, or making query to the core network node to determine whether or not to preferentially treat the terminal by the target base station when the terminal moves from the source base station to the target base station;
- notifying to the target base station preferential information indicative of whether or not to preferentially treat the terminal by the target base station;
- holding, by the terminal, an allowed list that is a list of closed subscriber group identification information on a base station to which the terminal is connectable; and
- determining, by the gateway device and based on a determination table of the gateway device, eligibility of making query to the core network node and eligibility of notifying the preferential information to the target base station when the terminal moves from the source base station to the target base station,
- wherein the determination table prescribes the eligibility of making the query to the core network node and the eligibility of notifying the preferential information to the target base station, in accordance with closed subscriber group identification information on the source base station, closed subscriber group identification information on the target base station, access modes of the source base station and the target base station, identification information on the terminal, and allowed list information indicative of whether or not the allowed list of the terminal includes the closed subscriber group identification information on the source base station.

14. A communication method by a gateway device which connects a source base station and a target base station to a core network, at least one terminal being connected to the source base station before movement of the terminal and being connected to the target base station after the movement of the terminal;
- the method comprising:
- determining by the gateway device itself, or making query to a node in the core network to determine whether or not to preferentially treat the terminal by the target base station when the terminal moves from the source base station to the target base station;
- notifying to the target base station preferential information indicative of whether or not to preferentially treat the terminal by the target base station;
- holding, by the terminal, an allowed list that is a list of closed subscriber group identification information on a base station to which the terminal is connectable; and
- determining, by the gateway device and based on a determination table of the gateway device, eligibility of making query to the core network node and eligibility of notifying the preferential information to the target base station when the terminal moves from the source base station to the target base station, wherein the determination table prescribes the eligibility of making the query to the core network node and the eligibility of notifying the preferential information to the target base station, in accordance with closed subscriber group identification information on the source base station, closed subscriber group identification information on the target base station, access modes of the source base station and the target base station, identification information on the terminal, and allowed list information indicative of whether or not the allowed list of the terminal includes the closed subscriber group identification information on the source base station.

15. A non-transient computer-readable storage medium storing a non-transient computer-readable storage medium storing a program for a computer provided in a gateway device which connects a source base station and a target base station to a core network, at least one terminal being connected to the source base station before movement of the terminal and being connected to the target base station after the movement of the terminal, the program causing the computer to execute:

determining by the gateway device, or making query to a node in the core network to determine whether or not to preferentially treat the terminal by the target base station when the terminal moves from the source base station to the target base station; and notifying to the target base station preferential information indicative of whether or not to preferentially treat the terminal by the target base station;

holding, by the terminal, an allowed list that is a list of closed subscriber group identification information on a base station to which the terminal is connectable; and determining, by the gateway device and based on a determination table of the gateway device, eligibility of making query to the core network node and eligibility of notifying the preferential information to the target base station when the terminal moves from the source base station to the target base station, wherein the determination table prescribes the eligibility of making the query to the core network node and the eligibility of notifying the preferential information to the target base station, in accordance with closed subscriber group identification information on the source base station, closed subscriber group identification information on the target base station, access modes of the source base station and the target base station, identification information on the terminal, and allowed list information indicative of whether or not the allowed list of the terminal includes the closed subscriber group identification information on the source base station.

* * * * *